US012173891B2

(12) United States Patent
Wang et al.

(10) Patent No.: US 12,173,891 B2
(45) Date of Patent: Dec. 24, 2024

(54) LED LIGHTING DEVICE WITH ENHANCED LIGHT TRANSMISSION

(71) Applicant: JIAXING SUPER LIGHTING ELECTRIC APPLIANCE CO., LTD, Jiaxing (CN)

(72) Inventors: Mingbin Wang, Jiaxing (CN); Zhichao Zhang, Jiaxing (CN); Dongmei Zhang, Jiaxing (CN); Jifeng Xu, Jiaxing (CN); Tao Jiang, Jiaxing (CN); Kuan Lin, Jiaxing (CN)

(73) Assignee: JIAXING SUPER LIGHTING ELECTRIC APPLIANCE CO., LTD, Jiaxing (CN)

( * ) Notice: Subject to any disclaimer, the term of this patent is extended or adjusted under 35 U.S.C. 154(b) by 0 days.

(21) Appl. No.: 18/369,143

(22) Filed: Sep. 16, 2023

(65) Prior Publication Data

US 2024/0003517 A1 Jan. 4, 2024

Related U.S. Application Data

(63) Continuation of application No. 17/869,862, filed on Jul. 21, 2022, now Pat. No. 11,781,736, which is a (Continued)

(30) Foreign Application Priority Data

May 28, 2021 (CN) ......................... 202121172638.5
Sep. 10, 2021 (CN) ......................... 202111061744.0

(Continued)

(51) Int. Cl.

*F21V 7/00* (2006.01)
*F21K 9/62* (2016.01)

(Continued)

(52) U.S. Cl.

CPC .............. *F21V 7/0083* (2013.01); *F21K 9/62* (2016.08); *F21K 9/69* (2016.08); *F21V 5/007* (2013.01);

(Continued)

(58) Field of Classification Search

CPC .......... F21V 5/007; F21V 5/04; F21V 7/0091; F21V 17/002; F21V 29/507; F21V 29/83;

(Continued)

(56) References Cited

U.S. PATENT DOCUMENTS

2001/0001241 A1 5/2001 Kawakami et al.
2003/0165061 A1 9/2003 Martineau (Continued)

FOREIGN PATENT DOCUMENTS

CN 102287646 A 12/2011
CN 204592956 U 8/2015

(Continued)

*Primary Examiner* — Tracie Y Green

(74) *Attorney, Agent, or Firm* — Simon Kuang Lu

(57) ABSTRACT

An LED lighting device includes a seat having a baseplate, a sidewall, and an end wall. The first end of the sidewall is connected to a periphery of the baseplate and forms a chamber with the baseplate. The second end of the sidewall is connected to the end wall and forms a receiving space with the end wall. A light source containing a plurality of LED arrays is disposed in the chamber. An electric power source is disposed in the receiving space, and an optical assembly is disposed on the light source. The optical assembly includes a plurality of first optical members and a plurality of second optical members. Each of the first optical members covers one of the LED arrays. Each of the second optical members includes a set of optical walls surrounding one of the first optical members.

20 Claims, 23 Drawing Sheets

Related U.S. Application Data continuation of application No. 17/775,307, filed as application No. PCT/CN2021/143481 on Dec. 31, 2021.

(30) Foreign Application Priority Data

| | | |
|---|---|---|
| Nov. 11, 2021 | (CN) | 202111331195.4 |
| Nov. 11, 2021 | (CN) | 202111332265.8 |
| Nov. 26, 2021 | (CN) | 202111418895.7 |
| Dec. 2, 2021 | (CN) | 202111461923.3 |
| Dec. 13, 2021 | (CN) | 202111517441.5 |

(51) Int. Cl.

| | |
|---|---|
| ***F21K 9/69*** | (2016.01) |
| ***F21V 5/00*** | (2018.01) |
| ***F21V 19/00*** | (2006.01) |
| ***F21V 23/06*** | (2006.01) |
| *F21Y 105/10* | (2016.01) |
| *F21Y 105/16* | (2016.01) |
| *F21Y 113/00* | (2016.01) |
| *F21Y 115/10* | (2016.01) |

(52) U.S. Cl.

CPC ............ *F21V 19/003* (2013.01); *F21V 23/06* (2013.01); *F21Y 2105/10* (2016.08); *F21Y 2105/16* (2016.08); *F21Y 2113/00* (2013.01); *F21Y 2115/10* (2016.08)

(58) Field of Classification Search

CPC . G02B 19/0028; G02B 19/0066; F21S 8/033; F21S 8/04; F21Y 2103/10; F21Y 2105/10; F21Y 2115/10; F21Y 2105/14

See application file for complete search history.

(56) References Cited

U.S. PATENT DOCUMENTS

| | | | | |
|---|---|---|---|---|
| 2009/0310381 | A1* | 12/2009 | Chang | F21V 29/76 362/555 |
| 2010/0207131 | A1 | 8/2010 | Chiang et al. | |
| 2011/0292658 | A1 | 12/2011 | Ho | |
| 2012/0206911 | A1 | 8/2012 | Pickard et al. | |
| 2013/0201693 | A1 | 8/2013 | Tang | |
| 2013/0265751 | A1 | 10/2013 | Edmond et al. | |
| 2014/0168992 | A1 | 6/2014 | Xue et al. | |
| 2015/0138766 | A1 | 5/2015 | Kuo | |
| 2016/0003454 | A1 | 1/2016 | Ye | |
| 2018/0299096 | A1* | 10/2018 | Zhou | F21V 5/048 |
| 2019/0004238 | A1 | 1/2019 | Peng et al. | |
| 2019/0063723 | A1 | 2/2019 | Yamada | |
| 2022/0034481 | A1 | 2/2022 | Caprara et al. | |
| 2022/0299197 | A1 | 9/2022 | Henrici et al. | |

FOREIGN PATENT DOCUMENTS

| | | | |
|---|---|---|---|
| CN | 206459105 | U | 9/2017 |
| CN | 208566388 | U | 3/2019 |
| CN | 208997833 | U | 6/2019 |
| CN | 209638797 | U | 11/2019 |
| CN | 211040856 | U | 7/2020 |
| CN | 112781012 | A | 5/2021 |
| CN | 215372333 | U | 12/2021 |
| JP | 2016058284 | A | 4/2016 |

* cited by examiner

LED LIGHTING DEVICE WITH ENHANCED LIGHT TRANSMISSION

CROSS-REFERENCE TO RELATED APPLICATIONS

This application is a continuation application of U.S. application Ser. No. 17/869,862 filed on 2022 Jul. 21, which is a continuation application of U.S. application Ser. No. 17/775,307 filed on 2022 May 8, which claims priority to the following Chinese Patent Applications No. CN 202121172638.5 filed on 2021 May 28, CN 202111061744.0 filed on 2021 Sep. 10, CN 202111331195.4 filed on 2021 Nov. 11, CN 202111332265.8 filed on 2021 Nov. 11, CN 202114418895.7 filed on 2021 Nov. 26, CN 202111461923.3 filed on 2021 Dec. 2, CN 202111517441.5 filed on 2021 Dec. 13, the disclosures of which are incorporated herein in their entirety by reference.

BACKGROUND

Technical Field

The invention relates to lighting apparatuses, particularly to LED lighting devices.

Related Art

Light-emitting diode (LED) lighting has been widely adopted because of the advantages of energy-saving and long life. In currently available LED lighting, flat lamps and grille lamps are common.

Typical planar lamps usually include a light strip, a base frame, a light guide plate, and a diffuser plate. The light strip is disposed beside the base frame to provide lateral light emitting. Light emitted by the light strip is ejected from the diffuser plate via the light guide plate. Such a planar lamp has the following drawbacks. Light emitted by the light strip will generate a greater light loss after passing through the light guide plate and the diffuser plate resulting in low light emitting efficiency. The guide plate is high in cost which is disadvantageous to cost control. Also, glare control of the planar lamp is poor.

A typical grille lamp includes a base frame, a light source (may adopt a light strip, fluorescent tube, or LED tube), and a grille. The light source is fixed on the base frame. The grille is disposed on the light emitting side of the light source. Such a grille lamp has the following drawbacks. First, the arrangement of the grille is disadvantageous to the height control of the grille lamp causing cost increase in packaging and transportation. The high cost of the grille is disadvantageous to the cost control of the whole lamp. The grille generates more significant light loss, and a dark area is easy to occur in the grille to be disadvantageous to light emitting.

Given the above drawbacks, the inventors have devoted themselves to find solutions to the problems mentioned above. The result of the inventors' intensive research are embodiments of the invention that are reasonable and practical to overcome the above drawbacks.

SUMMARY

Several embodiments relating to the disclosure are briefly described in this summary. However, the terms herein are used to describe only certain embodiments disclosed in this specification (whether or not already claimed) and not to be a complete description of all possible embodiments. Certain embodiments of the various features or aspects of the disclosure described above may be combined in various ways to form an LED lighting device or a portion thereof.

Embodiments of the present disclosure provide a new LED lighting device and features in various aspects to solve the above problems.

The present disclosure provides an LED lighting device, which includes a seat, a light source, an electric power source and an optical assembly. The seat has a baseplate, a sidewall and an end wall. The sidewall comprises a first end and a second end. The first end of the sidewall connects to a periphery of the baseplate and forms a chamber with the baseplate, the second end of the sidewall connects to the end wall and forms a receiving space with the end wall. The chamber is separated from the receiving space by the sidewall and the end wall and the baseplate are substantially parallel to each other. The light source is disposed in the chamber and is attached to a surface of the baseplate. The light source comprises a plurality of LED arrays and each of the LED arrays comprises at least one LED chip. The electric power source is disposed in the receiving space and electrically connects to the light source. The optical assembly is disposed on the light source. The optical assembly comprises a plurality of first optical members and a plurality of second optical members corresponding to the first optical members. Each one of the first optical members covers one of the LED arrays. Each of the second optical members comprises a set of optical walls and each set of optical walls surrounds one of the first optical members. The optical wall and an optical axis of the LED chip form an acute angle.

In some embodiments, each one of the LED arrays is arranged to correspond to one of the first optical members and a quantity of the LED arrays are the same as the first optical members.

In some embodiments, each of the LED arrays is substantially cloaked by one of the first optical members.

In some embodiments, each one of the first optical members has a light-emitting surface, whereby a portion of light emitted from the LED arrays penetrates the first optical member and then exits from the light-emitting surface.

In some embodiments, wherein the light-emitting surface has a main portion and two end portions separately and substantially located at two ends of the main portion, and further wherein a cross-section of the main portion has an arcuate shape.

In some embodiments, the light-emitting surface is a light transmissive and diffusive surface.

In some embodiments, the baseplate comprises a positioning unit for positioning the light source.

In some embodiments, the electric power source is disposed on a back side of the seat and the light source is disposed on a front side of the seat.

In some embodiments, the LED lighting device further comprises an electric connecting unit attached to the baseplate and electrically connecting the electric power source to the light source.

In some embodiments, the sidewall is formed by bending the periphery of baseplate.

In some embodiments, the optical walls are arranged obliquely relative to the baseplate.

In some embodiments, four optical walls of the second optical members are connected in series and surrounding the first optical member, and each optical wall is a plane wall.

In some embodiments, at least a portion of light emitted from the LED arrays penetrates the optical walls and at least a portion of light emitted from the LED arrays is reflected by the optical walls.

In some embodiments, the optical assembly further comprises a first connecting wall, the optical walls of two adjacent second optical members are connected through the first connecting wall, whereby at least a portion of light penetrating the optical walls exits from the first connecting wall to prevent the first connecting wall from forming a dark area.

In some embodiments, the first optical member and the second optical member are composed of substantially the same laminate material and are an integrated element, wherein the material has reflective and light-permeability functions.

In some embodiments, the light-emitting surface is more adjacent to the LED array than the second optical member.

In some embodiments, the light source comprises a plurality of circuit boards, a plurality of LED arrays are disposed on the plurality of the circuit boards, and each LED array comprises at least one LED chip.

In some embodiments, the electric connecting unit is attached to the baseplate and electrically connects the plurality of the circuit boards to the electric power source.

In some embodiments, the optical wall and an optical axis of the LED chip form an acute angle A, and the acute angle A is between about 30 degrees to about 60 degrees.

In some embodiments, an angle between the corresponding two sets of optical walls in the width direction of the first optical member is smaller than a beam angle of the LED chip.

DETAILED DESCRIPTION

Figure 1:
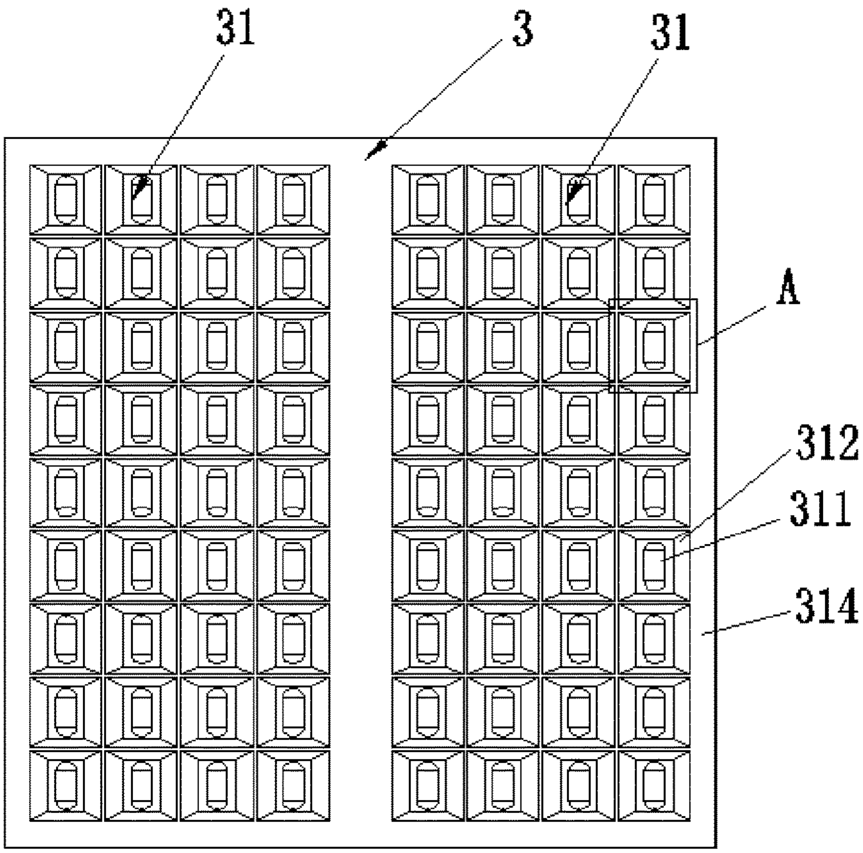
FIG. 1 is a front schematic view of an embodiment of the LED lighting device.

The following detailed description in association with the drawings is intended to provide further details of embodiments of the invention. The drawings depict embodiments of the invention. However, the following descriptions of various embodiments of this invention are presented herein for purpose of illustration and give examples only. It is not intended to be exhaustive or to be limited to the precise form disclosed. These exemplary embodiments are just examples and many implementations and variations are possible without the details provided herein. Contrarily, these embodiments make the disclosure thorough and complete and entirely convey the scope of the invention to persons having ordinary skill in the art. The same reference characters in the drawings indicate the same element.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes one or more any and all combinations of the associated listed items.

It will be understood that when an element such as a layer, region or substrate is referred to as being "on" or extending "over" another element, the element can be directly on another element or directly extended over another element, or an intervening element may also be present. In contrast, when an element is referred to as being "directly on" or "extending directly on" another element, there are no intervening elements present. It will also be understood that when an element is referred to as being "connected" or "coupled" to another element, it can be directly connected or coupled to another element or an intervening element may be present. In contrast, when an element is referred to as being "directly connected" or "directly coupled" to another element, there are no intervening elements present.

Some terms mentioned in the following description, such as "lower", "upper", "above", "under", "perpendicular" or "horizontal" are used for clear structural relationship of an element, layer or region and another element, layer or region. It will be understood that these terms are intended to assist in understanding preferred embodiments of the invention with reference to the accompanying drawing Figures and with respect to the orientation of the sealing assemblies as shown in the Figures, and are not intended to be limiting to the scope of the invention or to limit the invention scope to the preferred embodiments shown in the Figures. In the present invention, the terms "perpendicular", "horizontal" and "parallel" are defined in a range of ±10% based on a standard definition. For example, "perpendicular" (perpendicularity) means the relationship between two lines which meet at a right angle (90 degrees). However, in the present invention, "perpendicular" may encompass a range from 80 degrees to 100 degrees.

The phrases used herein are for the purpose of describing particular embodiments only and are not intended to limit the invention. As used herein, the singular forms "a" "an" and "the" are intended to include the plural forms as well, unless the context clearly dictates otherwise. It will also be understood that the terms "comprise", "comprising", "include" and/or "including" used herein designate the presence of recited features, integers, steps, operations, elements and/or parts, but do not preclude the presence or addition of one or more other features, integers, steps, operations, elements, parts and/or combinations thereof.

Unless otherwise defined, all terms (including technical and scientific terms) used herein have the same meaning as commonly understood by a person having ordinary skill in the art. It will also be understood that terms used herein should be construed to have meanings consistent with their meanings in the context of this specification and the relevant art, and should not be construed in an idealized or overly formal manner unless they are expressly so limited.

Unless explicitly stated otherwise, comparative quantitative terms such as "less than" and "greater than" are intended to encompass the concept of equality. As an example, "less than" means not only "less than" in the strictest mathematical sense, but also "less than or equal to."

Referring to FIGS. 1 to 6, embodiments of the present invention provide a light-emitting diode (LED) lighting device which includes a seat 1, a light source 2, an optical assembly 3 and an electric power source 4. The light source 2 is electrically connected to the electric power source 4. The light source 2 is disposed on the seat 1. The optical assembly 3 is disposed on a light-emitting direction of the light source 2.

Figure 9:
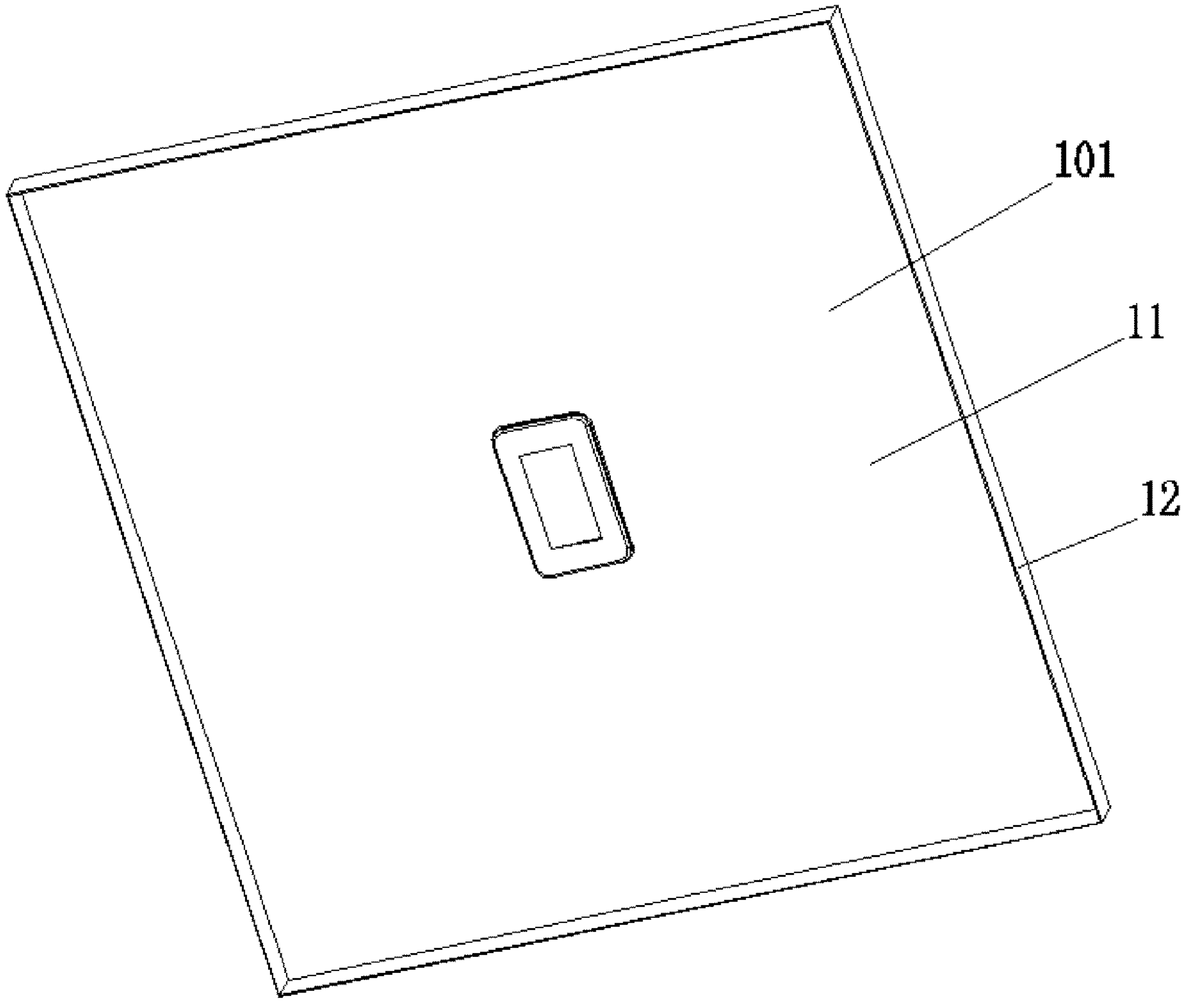
FIG. 9 is a perspective schematic view of the seat.

Referring to FIG. 9, the seat 1 in the embodiment has a baseplate 11 and a sidewall 12. The sidewall 12 is disposed on a periphery of the baseplate 11 to form a chamber 101 between the baseplate 11 and the sidewall 12. The light source 2 is disposed in the chamber 101. The seat 1 may be made of metal such as iron or stainless steel to increase its thermal performance. In some embodiments, the seat 1 is formed by an integrated structure. The sidewall 12 is formed by directly bending the baseplate 11, in some embodiments. In some embodiments, the seat 1 is formed by an integrated structure which is directly formed by pressing or stretching to possess better structural strength. In some embodiments, the seat 1 may also adopt plastic material.

Figure 6:
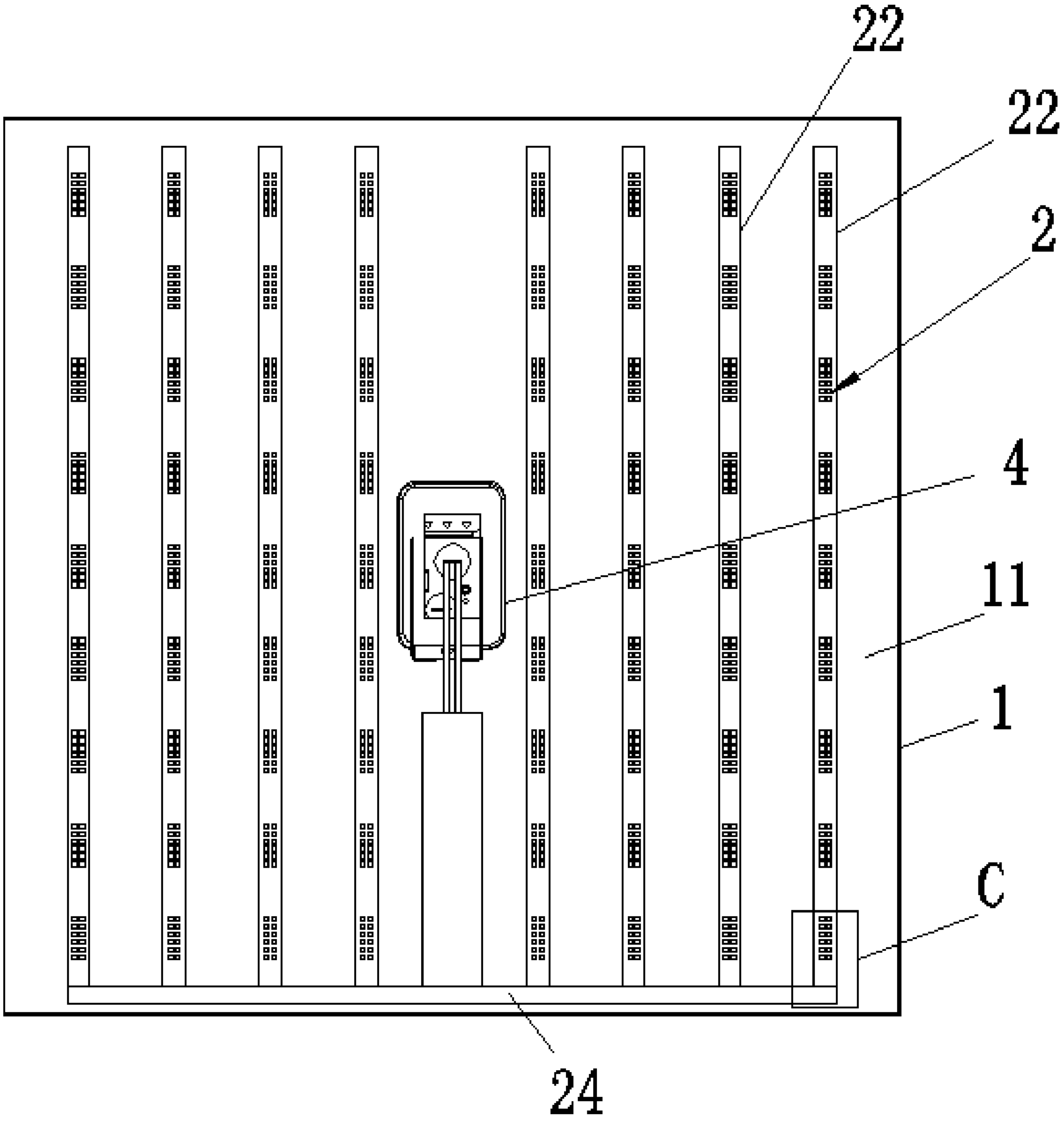
FIG. 6 is a schematic view of FIG. 1 which removes the optical assembly.
Figure 7:
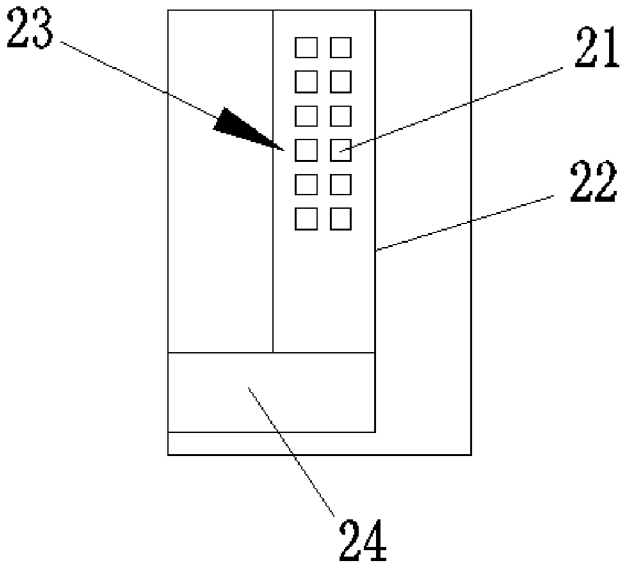
FIG. 7 is an enlarged view of part C in FIG. 6.

Referring to FIGS. 6 and 7, in some embodiments, the light source 2 may be directly fixed on the baseplate 11 of the seat 1. The light source 2 includes LED chips and a circuit board 22. The LED chips 21 are fixed on the circuit board 22. The light source 2 is directly fixed to the baseplate 11 of the seat 1 through the circuit board 22. In some embodiments, the light source 2 is directly fixed to the baseplate 11 of the seat 1 by means of bonding. In other embodiments, the light source 2 is clamped on the baseplate 11 of the seat 1 through the circuit board 22. In still other embodiments, the light source 2 is fixed to the baseplate 11 of the seat 1 by soldering. In the above embodiments, the light source 2 and the baseplate 11 of the seat 1 form a heat conduction path to transfer the heat from the LED chips 21 which are working rapidly to the seat 1 and dissipated by the seat 1 to improve the cooling efficiency. Still referring to FIG. 7, in some embodiments, the LED chips 21 on the circuit board 22 are arranged in two rows. Please refer to FIGS. 13 and 15. In some embodiments, the LED chips 21 on the circuit board 22 are arranged in a single row.

Figure 12:
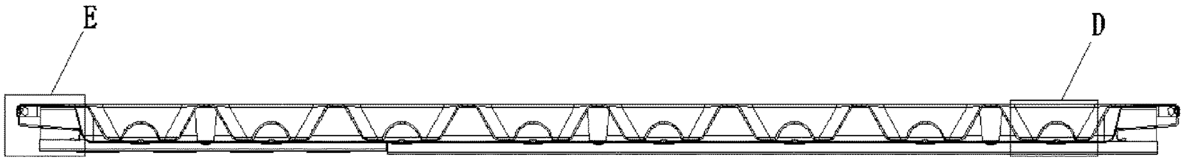
FIG. 12 is a cross-sectional schematic view of an embodiment of the LED lighting device.
Figure 13:
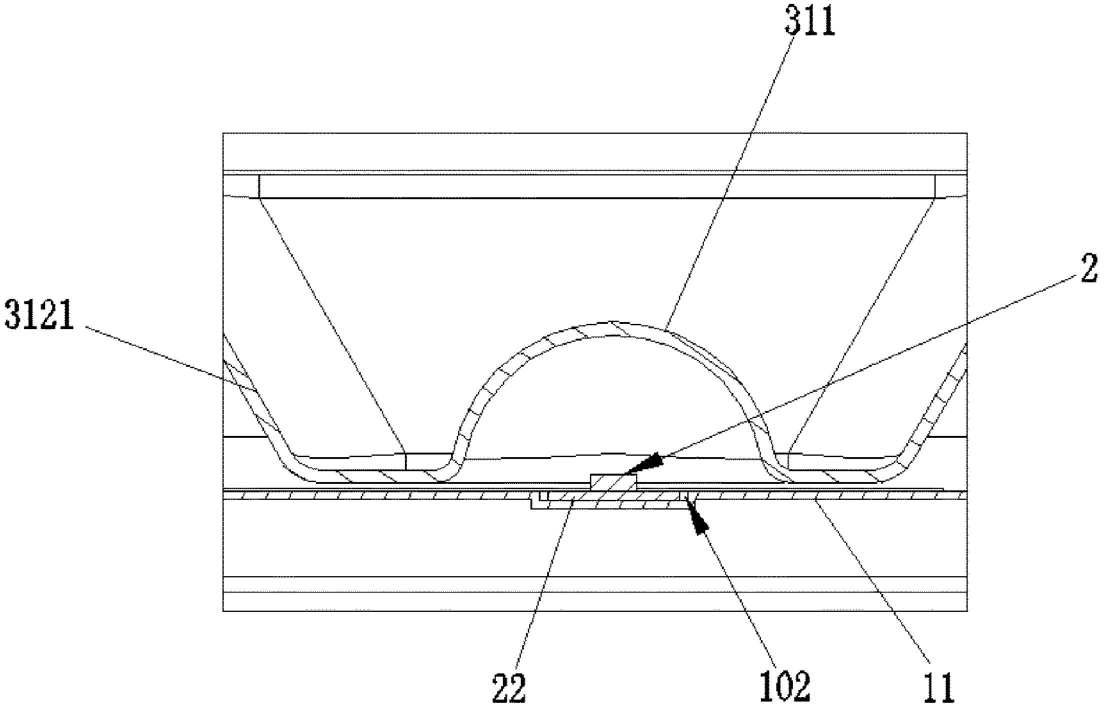
FIG. 13 is an enlarged view of part D in FIG. 12.
Figure 15:
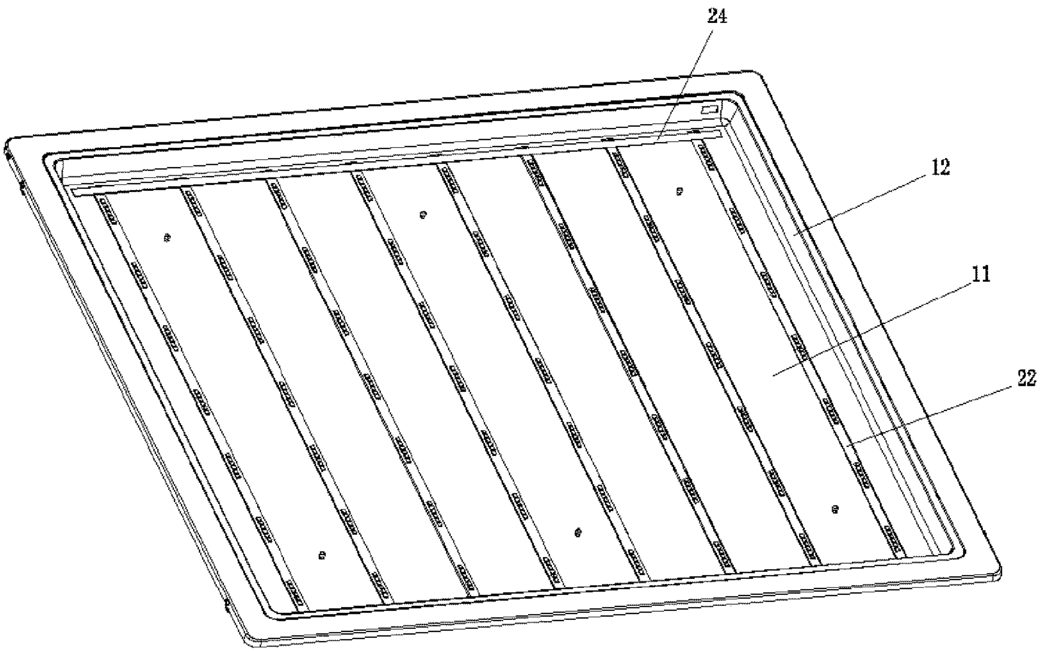
FIG. 15 is a perspective schematic view of an embodiment of the LED lighting device which removes the optical assembly.

Referring to FIGS. 12, 13 and 15, in some embodiments, the seat 1 may be provided with a positioning unit 102 for positioning the light source 2. In some embodiments, the positioning unit 102 includes a strip-shaped trench formed on the baseplate 11. A part or the whole of the circuit board 22 of the light source 2 is received in the trench to fix the circuit board 22 at a predetermined position on the baseplate 11. In addition, the trench formed on the baseplate 11 by pressing is equivalent to a reinforced rib disposed on the baseplate 11 to increase the structural strength of flexural resistance of the baseplate 11. In one embodiment, a thickness of the circuit board 22 is approximately equal to a depth of the trench. An electric connecting unit 24 may be attached on the baseplate 11 and is electrically connected to the circuit board 22 in the trench. The electric connecting unit 24 attached on the baseplate 11 can tightly press the circuit board 22 to prevent the circuit board 22 from loosening. Also, the electric connecting unit 24 may be fixed on the baseplate 11, for example, by an adhesive or screws, to increase the stability and prevent the electric connection between the electric connecting unit 24 and the circuit board 22 from separating, thus causing a malfunction due to loosening of the electric connecting unit 24.

Figure 2:
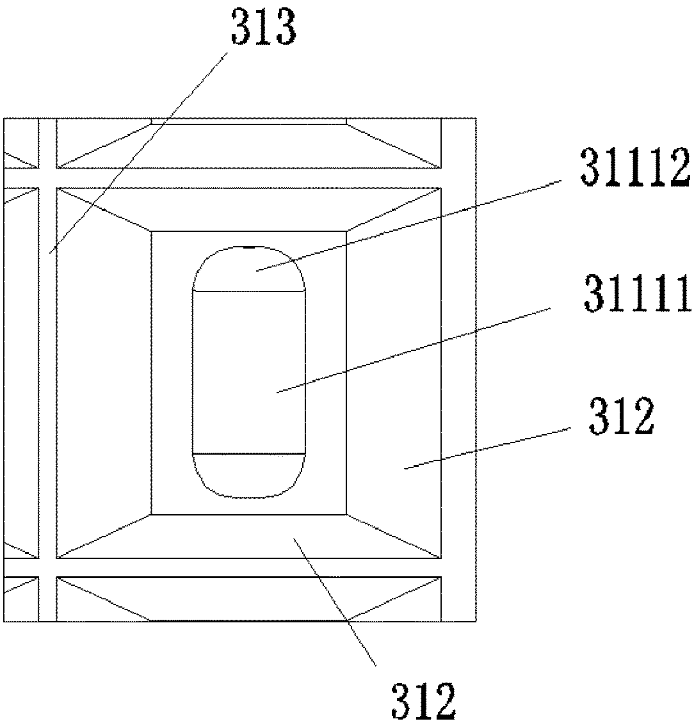
FIG. 2 is an enlarged view of part A in FIG. 1.
Figure 3:
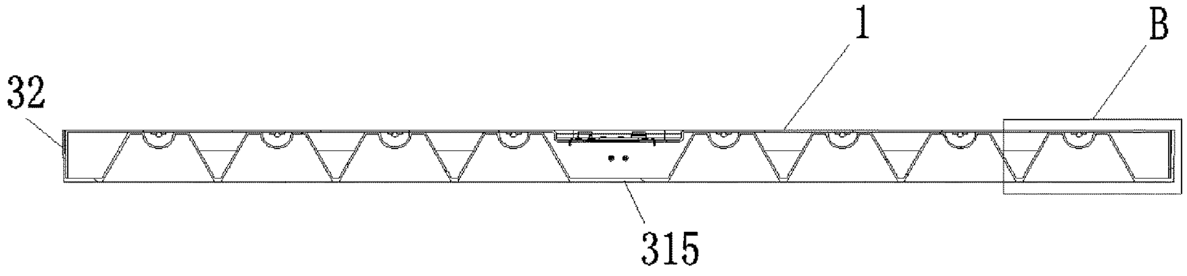
FIG. 3 is a cross-sectional view of an embodiment of the LED lighting device.

Referring to FIGS. 1 to 3, in one embodiment, the optical assembly 3 includes an optical unit 31 and an installing unit 32. The installing unit 32 corresponds to the seat 1. The installing unit 32 connects with the sidewall 12 of the seat 1. The installing unit 32 may be disposed inside or outside the sidewall 12. In one embodiment, the installing unit 32 is disposed outside the sidewall 12 so that the optical assembly 3 completely covers a light-emitting side of the LED lighting device on the seat 1. When the LED lighting device is installed on the ceiling, the seat 1 is not exposed, so a user cannot see the seat 1. Only one set of the optical unit 31 is provided.

Figure 10:
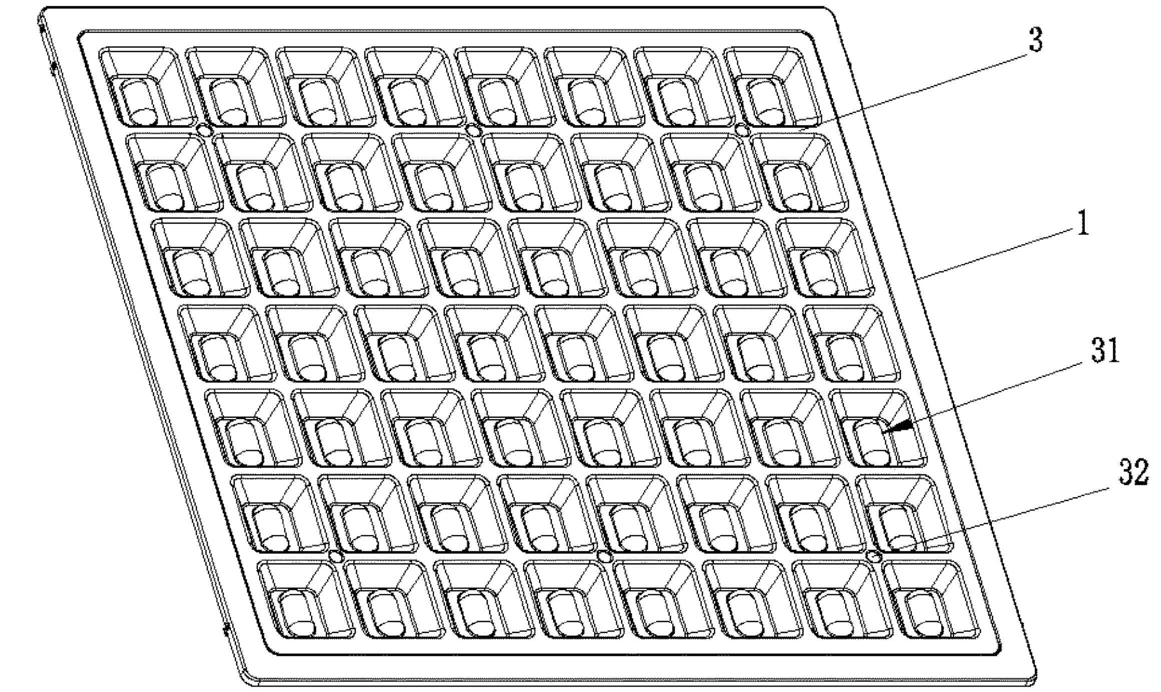
FIG. 10 is a structural schematic view of an embodiment of the LED lighting device.
Figure 11:
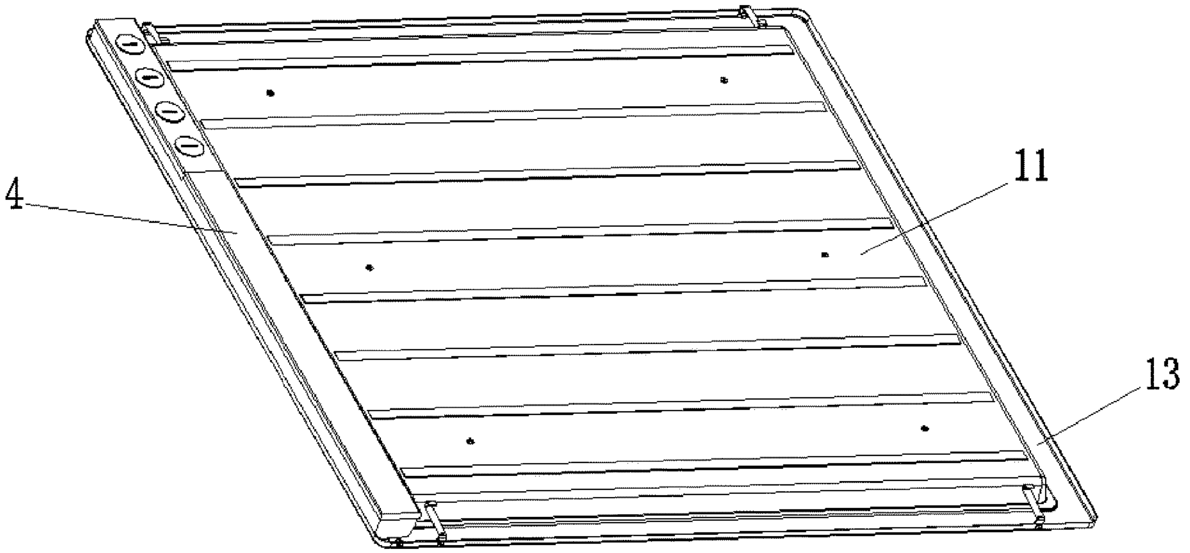
FIG. 11 is a structural schematic view of an embodiment of the LED lighting device.
Figure 16:
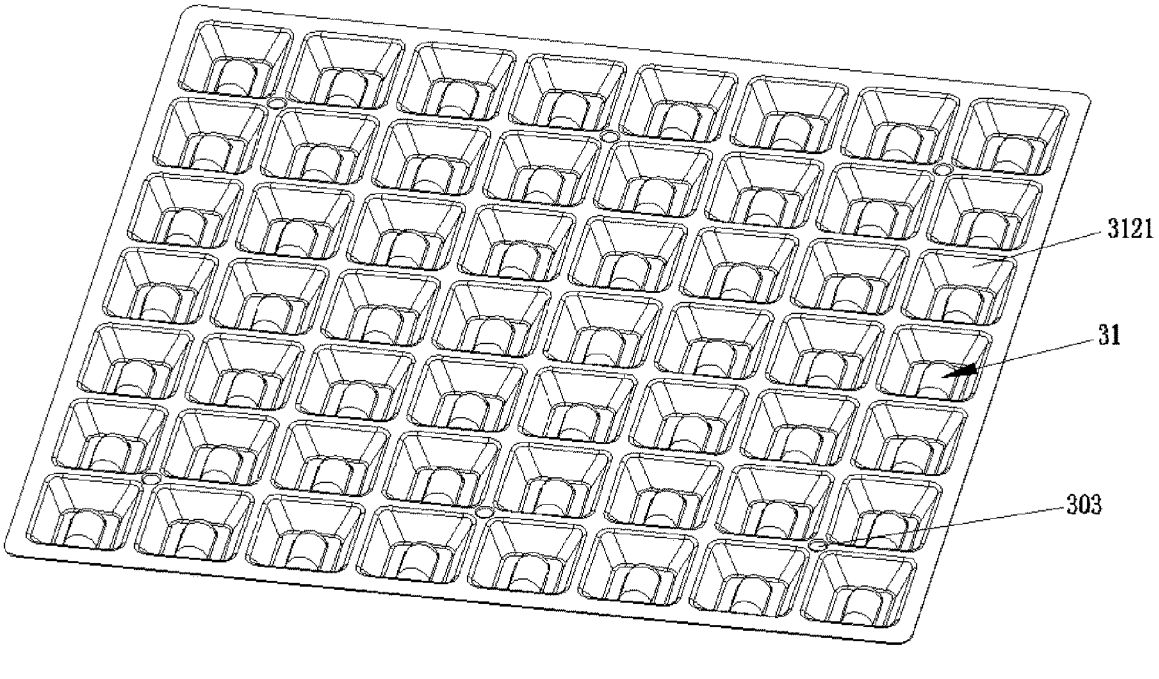
FIG. 16 is a perspective schematic view of an embodiment of the optical assembly of the LED lighting device.
Figure 17:
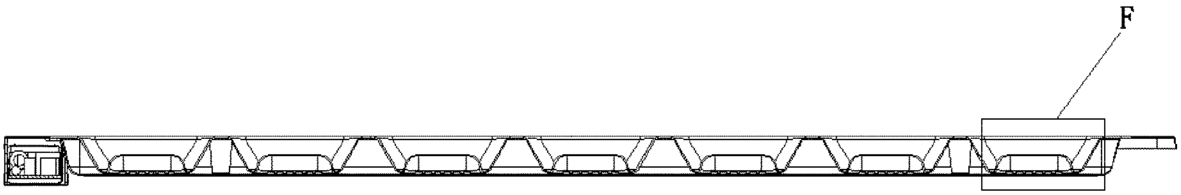
FIG. 17 is a cross-sectional schematic view of an embodiment of the LED lighting device.
Figure 18:
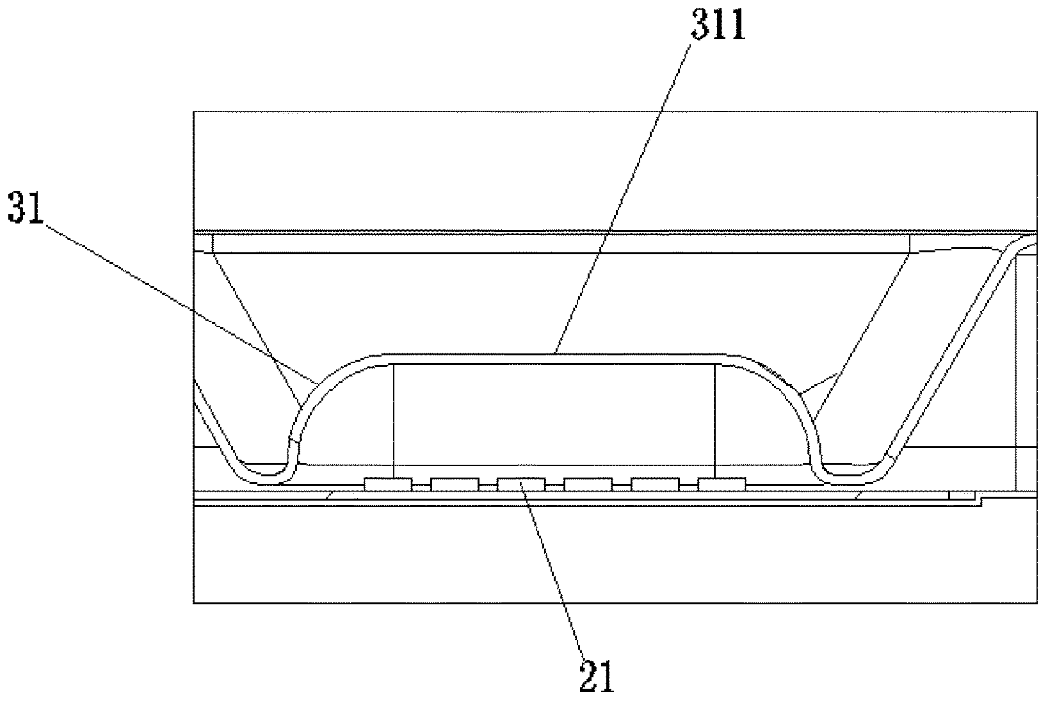
FIG. 18 is an enlarged view of part F in FIG. 17.
Figure 19:
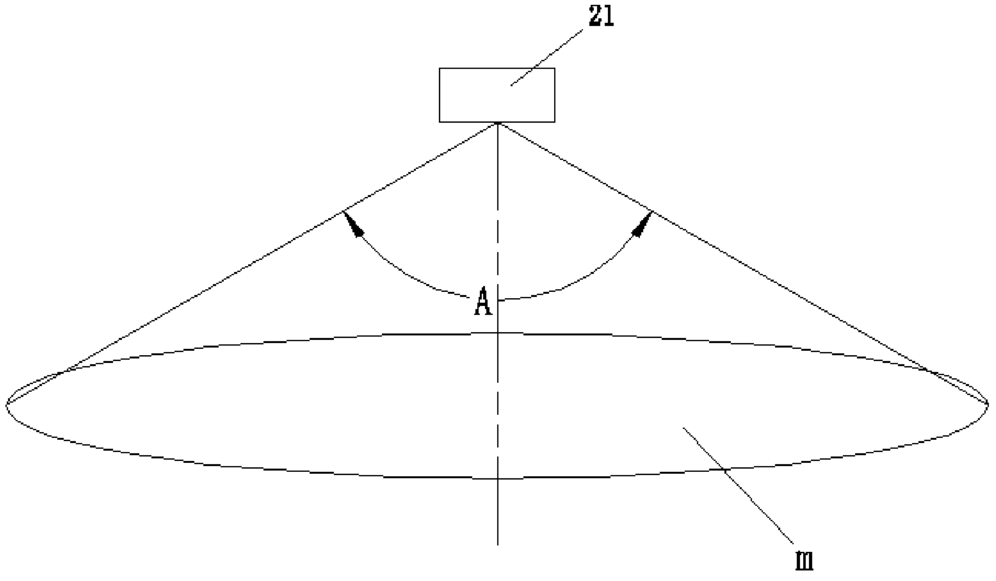
FIG. 19 is a schematic view of light emitting of the LED chip.

Referring to FIGS. 10 and 16, in one embodiment, the installing unit 32 includes an aperture 303 formed on the optical assembly 3. Correspondingly, the seat 1 is also formed with an aperture corresponding to the aperture 303. Thus, the optical assembly 3 is fixed to the seat 1 by inserting a rivet into the corresponding apertures of the optical assembly 3 and the seat 1.

Referring to FIGS. 21 to 24, in one embodiment, the installing unit is disposed on a periphery of the optical assembly 3 and includes a wall portion 321. The wall portion 321 surrounds the sidewall 12 of the seat 1 and outside the sidewall 12. The wall portion 321 is disposed with a bending portion 3211. The bending portion 3211 sheathes or abuts against an end of the sidewall 12 in a thickness direction of the LED lighting device, so the bending portion 3211 and the optical assembly 3 can clamp the sidewall by themselves to fix the optical assembly 3 on the seat 1. Also, by fixing in such a manner, the optical assembly 3 and the seat 1 can be fixed without any fastener (such as screws or rivets). This can prevent a fastener disposed to a light-emitting surface of the optical assembly 3 from affecting light emitting of the optical assembly 3 (for example, the light-emitting surface of the optical assembly 3 forms a local dark spot because of arranging a fastener on the light-emitting surface of the optical assembly 3) and can guarantee integrity and beauty of appearance of the optical assembly 3.

The optical assembly 3 is made of plastic in some embodiments. When the optical assembly 3 is placed outside the seat 1, the wall portion 321 of the optical assembly 3 may be deformed by hot pressing to form the bending portion 3211.

In other embodiments, when the optical assembly 3 is placed outside the seat 1, the wall portion 321 and the sidewall 12 of the seat 1 may also be fixed by clips or fasteners.

The wall portion 321 of the optical assembly 3 disposed outside and fixed to the sidewall 12 can simplify the structure. This can reduce a bezel of the lamp, improve beauty and the effect of light emitting and reduce dark areas resulting from the bezel.

Referring to FIGS. 1 to 4, the optical unit 31 of the embodiment includes multiple first optical members 311 (light-permeable parts). The light from the light source 2 can penetrate the first optical members 311. The light source 2 includes multiple LED arrays 23. Each LED array 23 includes at least one LED chip 21. In the embodiment, each LED array 23 includes multiple LED chips 21. The LED arrays 23 correspond to the first optical members 311. In other words, each LED array 23 is arranged to correspond to one of the first optical members 311, they both are same in number. In other embodiments, the first optical members 311 may be greater than the LED arrays 23 in number.

In one embodiment, the LED chip 21 of the LED array 23 only corresponds to the first optical member 311. In other words, the LED chip of the LED array 23 is completely cloaked by the first optical member 311. At least part of the light from the LED chip 21 of the LED array 23 is emitted from the first optical member 311. In one embodiment, the first optical member 311 has a light-emitting surface 3111. There is a distance between the light-emitting surface 3111 and the LED chip 21 of the LED array 23. The light from the LED chip 21 is emitted from the light-emitting surface 3111.

Referring to FIGS. 6 and 7, the LED chips 21 of the LED array 23 are arranged along a first direction, according to one embodiment. The first optical member 311 (or the light-emitting surface 3111) is arranged along the first direction.

Referring back to FIGS. 1 to 4, the light-emitting surface 3111 has a main portion 31111 arranged in the first direction and two end portions 31112 separately located at two ends of the main portion 31111 along the first direction, according to one embodiment of the present invention. A cross-section of the main portion 31111 (a cross-section on the width direction of the light-emitting surface 3111) is of an arcuate shape, and each end portion 31112 is an arcuate surface, so that the light-emitting surface 3111 has a better effect of light emitting. In addition, in comparison with a flat surface, when the light from the LED chip 21 is emitted to an arcuate surface, reflection will decrease, so the light-emitting efficiency can be enhanced to improve the light efficiency. Also, the light-emitting surface 3111 is more adjacent to the LED chip 21 than the second optical member 312. When the LED chip 21 is working, the light-emitting surface 3111 has a higher temperature than the second optical member 312. Thus, the light-emitting surface 3111 adopting an arcuate shape can improve the structural strength and have better property of anti-deformation when heated. In other embodiments, the light-emitting surface 3111 may also be shaped into a spherical surface or a flat surface.

In one embodiment, each first optical member 311 is configured to possess an effect of light diffusion to increase a light-emitting angle of the light source 2 and prevent light from concentrating to cause visual uncomfortableness. In other embodiments, each first optical member 311 possesses an effect of light diffusion resulting from its own material property, for example, plastic or acrylic. In one embodiment, each first optical member 311 is coated with a diffusion coating or disposed with a diffusion film (not shown) to cause it have an effect of light diffusion.

Referring again to FIGS. 1 and 2, the optical unit 31 further has multiple second optical members 312 (anti-glare parts) corresponding to the first optical members 311, according to one embodiment of the present invention. The second optical members 312 are configured to reflect at least part of light emitted by the first optical members 311 and at least part of light emitted by the first optical members 311 penetrates the second optical members 312. At least part of light penetrating the second optical member 312 may be emitted from an adjacent one of the second optical members 312 or at least part of light penetrating the second optical member 312 is emitted from the second optical member 312 after reflection to prevent from forming a dark area at the second optical member 312 and to improve beauty of the LED lighting device which is illuminated. In addition, the second optical member 312 reflecting at least part of light emitted from the first optical member 311 generates a certain effect of light blocking and glare reducing.

Figure 4:
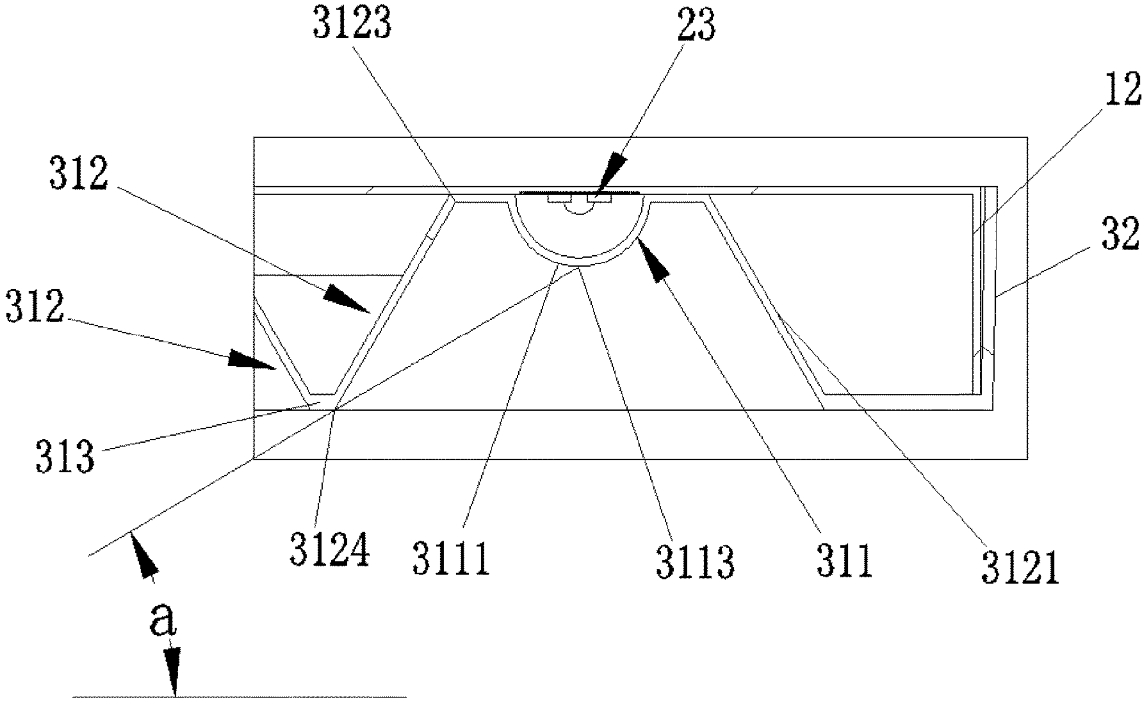
FIG. 4 is an enlarged view of part B in FIG. 3.

Referring to FIG. 4, the first optical member 311 has a bottom midpoint 3113 on a cross-section in a width direction of the first optical member 311, according to one embodiment. The second optical member 312 has a near end 3123 and a distal end 3124 in a height direction of the LED lighting device. The near end 3123 is more adjacent to the corresponding light source 2 than the distal end 3124. The distal end 3124 is the lowermost end of the second optical member 312 in the height direction of the LED lighting device. An angle a between a straight line through the bottom midpoint 3113 and the distal end 3124 and a lower end surface of the LED lighting device (the plane the second connecting wall 314 is located on) is between about 10 degrees and about 45 degrees. Further, an angle a between a straight line through the bottom midpoint 3113 and the distal end 3124 and a lower end surface of the LED lighting device (the plane the second connecting wall 314 is located on) is between 25 degrees and 35 degrees. Thus, part of light directly emitted by the first optical member 311 can be shaded to reduce glare.

In the embodiment, the second optical member 312 includes one or more sets of optical walls 3121. The optical walls 3121 are configured to possess functions of reflection and light-permeability. The optical walls 3121 surround the first optical member 311. In one embodiment, a set of second optical members 312 has four sets of optical walls 3121, the four sets of optical walls 3121 are connected in series, and each optical wall 3121 is configured to be a plane. In some embodiments, a set of second optical members 312 may have only one set of optical walls 3121, and a cross-section of each optical wall is of an annular shape. The optical wall 3121 may be a slant which is a slant arranged against the baseplate 11. As shown in FIGS. 10 and 16, in one embodiment, a smooth transition is formed between two adjacent optical walls 3121, such as an arcuate transition, to prevent an angle between two adjacent optical walls 3121 from forming a dark area and to make a region between two adjacent optical walls 3121 have a better effect of reflection.

Referring to FIG. 4, the optical walls 3121 of two adjacent second optical members 312 are connected through a first connecting wall 313, according to one embodiment. At least part of light penetrating the second optical member 312 is emitted from the first connecting wall 313 to prevent the first connecting wall 313 from forming a dark area. The first connecting wall 313 is greater than the optical wall 3121 in thickness to provide better connective strength. Also, thinned optical wall 3121 makes the optical wall 3121 have less light loss.

Figure 8:
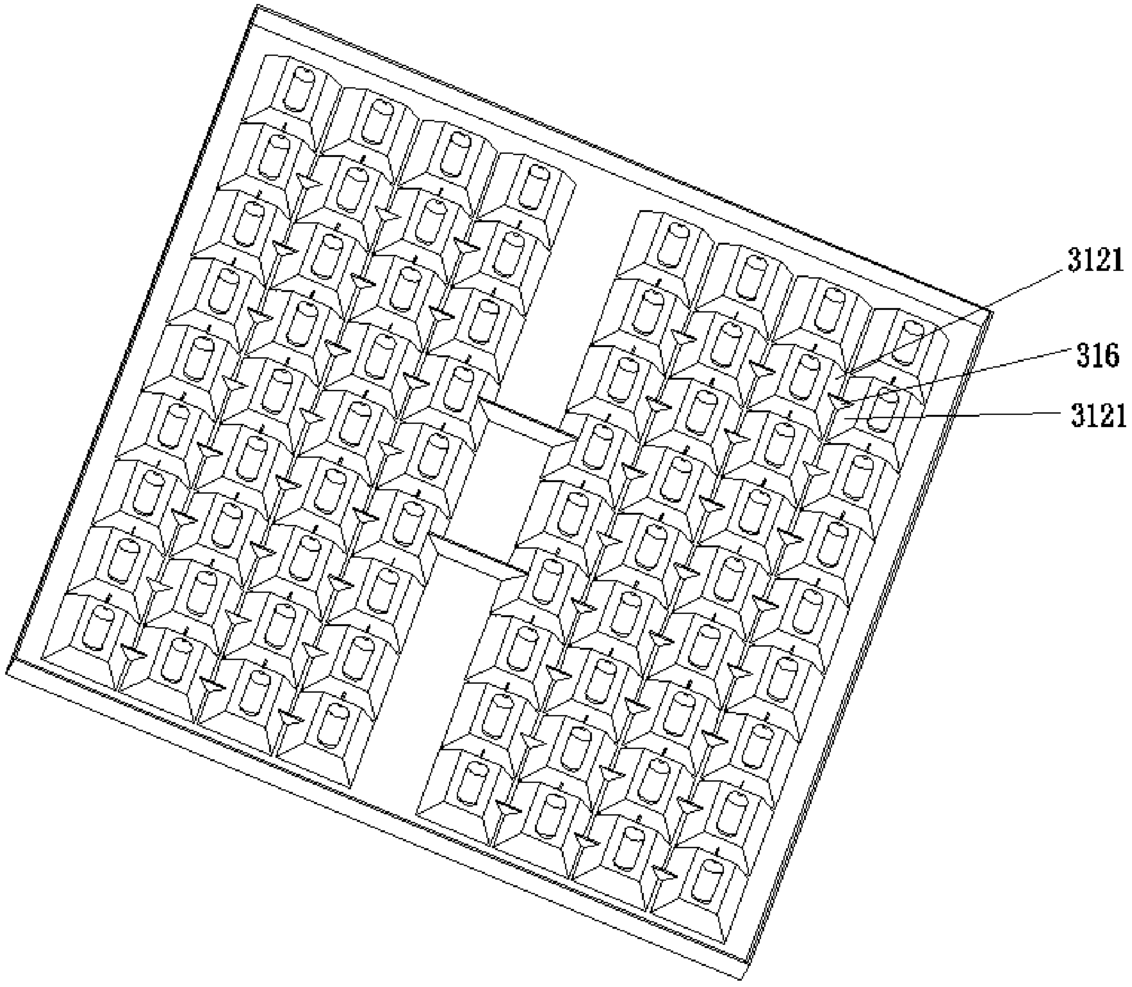
FIG. 8 is a perspective schematic view of the optical assembly.

Referring to FIGS. 1 and 8, the second optical member 312 may be disposed with a reinforcement structure 316 to improve the structural strength, according to one embodiment. The reinforcement structure 316 is disposed between the optical walls 3121 of adjacent second optical members 312. In other words, the optical walls 3121 between adjacent second optical members 312 are connected through the reinforcement structure 316. In some embodiment, the reinforcement structure 316 is a thin wall structure.

Figure 5:
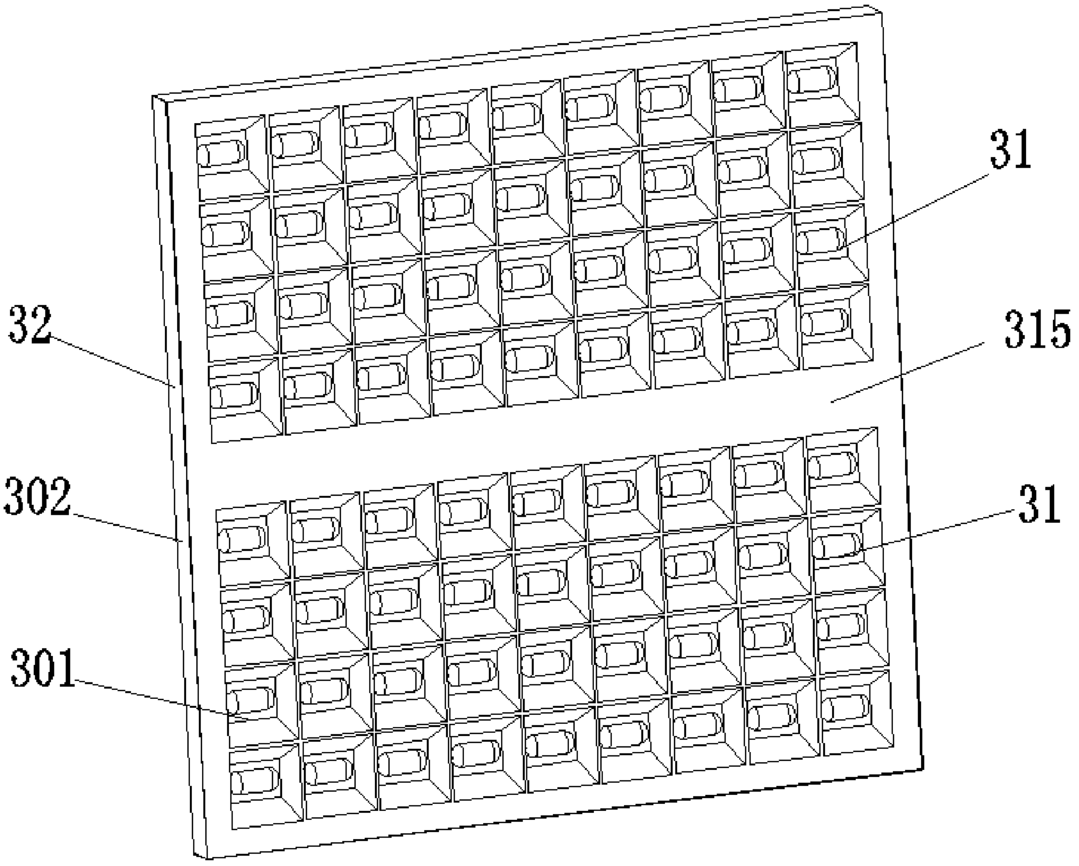
FIG. 5 is a perspective schematic view of an embodiment of the LED lighting device.

Referring to FIGS. 1 and 5, the optical unit 31 further includes a second connecting wall 314, according to one embodiment. The installing unit 32 and adjacent second optical member 312 are connected by the second connecting wall 314. At least part of light penetrating the second optical member 312 is emitted from the second connecting wall 314 to prevent the second connecting wall 314 from forming a dark area.

Figure 14:
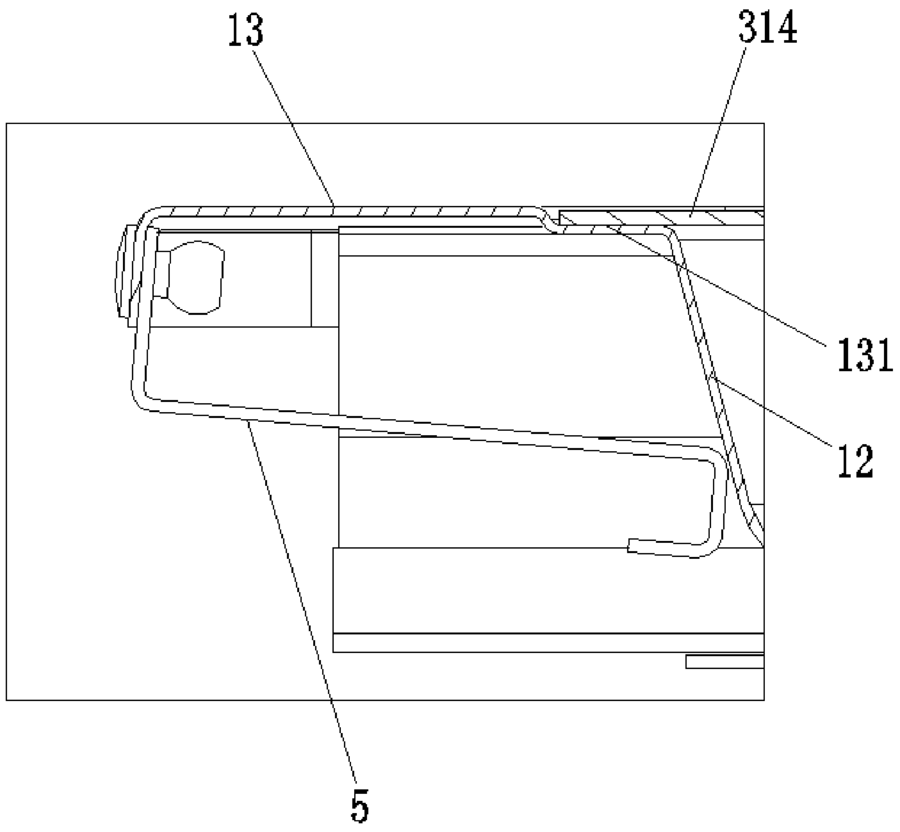
FIG. 14 is an enlarged view of part E in FIG. 12.

Referring to FIGS. 12 and 14, the second connecting wall 314 is adjacent to the end wall 13, according to some embodiments of the present invention. And, a surface of the second connecting wall 314 is substantially flush with the end wall 13 to improve beauty. In one embodiment, the end wall 13 is disposed with an indent 131. The second connecting wall 314 is placed in the indent 131 to make a surface of the second connecting wall 314 flush or substantially flush with the end wall 13.

In one embodiment, a wall thickness of each of the first optical member 311 and the second optical member 312 is less than a wall thickness of the first connecting wall 313 or the second connecting wall 314. The first optical member 311 is primarily used for light emitting of the light source 2 (too much wall thickness will increase light loss). The second optical member 312 is primarily used for reflection and light permeability (too much wall thickness will increase light loss). Both the first connecting wall 313 and the second connecting wall 314 are primarily used for structural connection which needs a certain strength. Thus, the abovementioned wall thicknesses can satisfy the demands in optics and structure.

In one embodiment, the optical assembly 3 is formed by an integrated structure.

Referring to FIGS. 1 and 6, the optical assembly 3 has a first region 301 corresponding to the baseplate 11 of the seat 1 and a second region 302 corresponding to the sidewall 12, according to one embodiment. The second region 302 is used to connect the sidewall 12. The second region 302 is disposed with the installing unit 32. In one embodiment, when the LED lighting device is working, the light source 2 is lit, and at least 80% of the first region 301 has light emission to obtain even light emitting. In another embodiment, when the LED lighting device is working, the light source 2 is lit, and at least 90% of the first region 301 has light emission to obtain even light emitting. In yet another embodiment, when the LED lighting device is working, the light source 2 is lit, and the entire first region 301 has light emission to obtain even light emitting.

In one embodiment, the first region 301 may include the abovementioned first optical member 311, second optical member 312, first connecting wall 313 and second connecting wall 314.

Referring to FIGS. 6 and 7, the circuit board 22 may be multiple, and each circuit board 22 may be disposed with one or more sets of LED arrays 23, according to some embodiments of the present invention. The embodiment further includes an electric connecting unit 24. The LED chips 21 on different circuit boards 22 are electrically connected by the electric connecting unit 24. In some embodiments, the electric connecting unit 24 adopts wires. In other embodiments, the electric connecting unit 24 adopts flexible circuit boards and the flexible circuit boards are fixed to the circuit boards 22 by soldering. The electric connecting unit 24 is affixed to the circuit boards 22 and is connected with the circuit boards 22 by soldering directly to implement electric connection. In some embodiments, the electric connecting unit 24 adopts PCB boards to perform connection.

Referring to FIG. 5, the optical unit 31 may be multiple, for example, two or four, according to one embodiment. Two adjacent optical units 31 are connected through the third connecting wall 315. A receiving space is formed between the third connecting wall 315 and the baseplate 11. The electric power source 4 is disposed in the receiving space, in some embodiments. In some embodiments, the electric power source 4 is set inside the LED lighting device (seat 1), compared to setting the electric power source 4 outside the seat 1, the electric power source 4 does not occupy additional height space of the LED lighting device and can reduce a height of the LED lighting device. In one embodiment, a height of the LED lighting device is less than 35 mm. In some embodiments, a height of the LED lighting device is less than 30 mm. In still other embodiments, a height of the LED lighting device is between 20 mm and 30 mm.

Referring to FIGS. 10 to 14, the electric power source 4 may also be disposed on the back of the baseplate 11, according to some embodiments. At this time, it is unnecessary to provide a receiving space in the optical unit 31, i.e., the third connecting wall 315 is not necessary (as shown in FIGS. 3 and 5). This makes the consistency of the optical unit 31 better and enhances the effect of light emitting and appearance beauty.

In one embodiment, the seat 1 is further disposed with an end wall 13. The end wall 13 is formed on a periphery of the seat 1 and connected to the sidewall 12. The end wall 13 and the baseplate 11 are parallel or substantially parallel to each other. The sidewall 12 and the end wall 13 form a receiving space (there is a height difference between the end wall 13 and the baseplate 11, at least part of the electric power source 4 is disposed in the height difference). At least part of the electric power source 4 in a height direction is located in the receiving space to reduce the height space of the LED lighting device occupied by the electric power source 4.

In one embodiment, at least half of the electric power source 4 in a height direction is located in the receiving space. A length of the electric power source 4 accounts for more than 80%, 85%, 90% or 95% of a length of the seat 1. Thus, the electric power source 4 can increase the structural strength of the seat 1 in a length direction.

Referring to FIGS. 21 to 24, the electric power source 4 is disposed between the seat 1 and the optical assembly 3, according to one embodiment. A surface of the seat 1 is outwardly (toward the back of the seat 1) formed with a protrusion 103, the protrusion 103 is formed with a recess 104 on a front side of the seat 1, and part or all of the electric power source 4 is located in the recess 104. Further, the seat 1 may be disposed with a cap 105 which covers the recess 104 so as to form a receiving space between the recess 104 and the cap 105. The electric power source 4 is located in the receiving space 106. The cap 105 protrusively disposed on a front side of the seat 1. Thus, the receiving space 106 is greater than the recess 104 in volume.

In the above embodiments, the electric power source 4 is not necessary to additionally provide an independent power source box to simplify structure and reduce costs.

Figure 26:
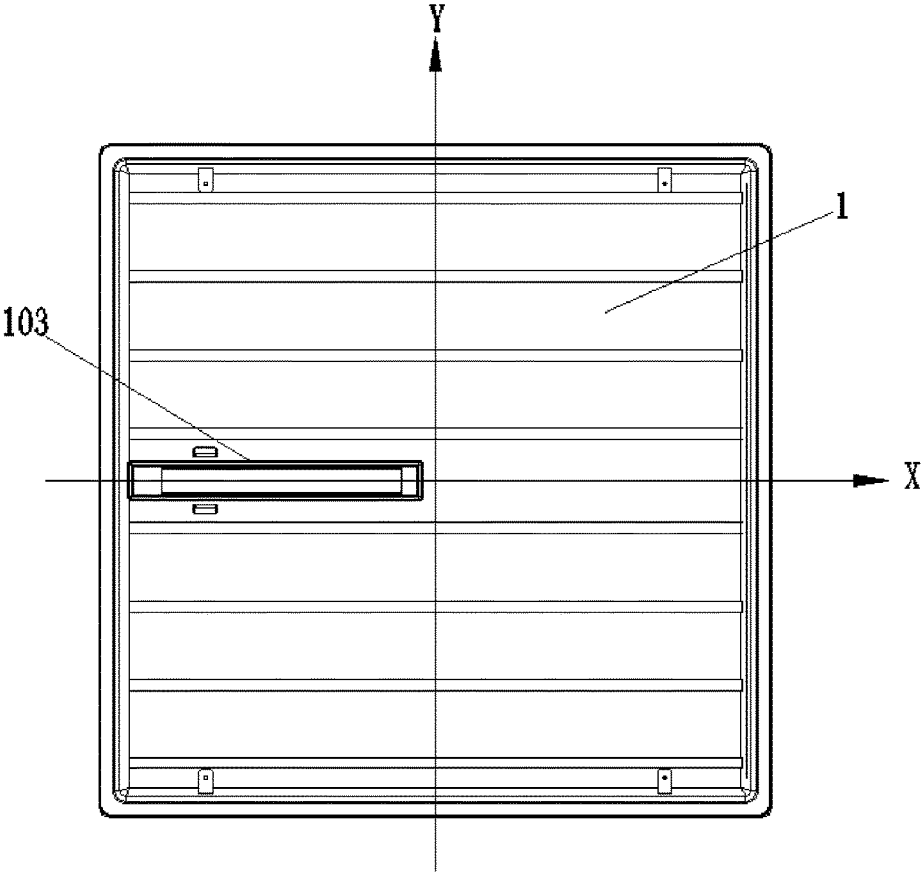
FIGS. 26-28 are front schematic views of some embodiments of the LED lighting device.
Figure 27:
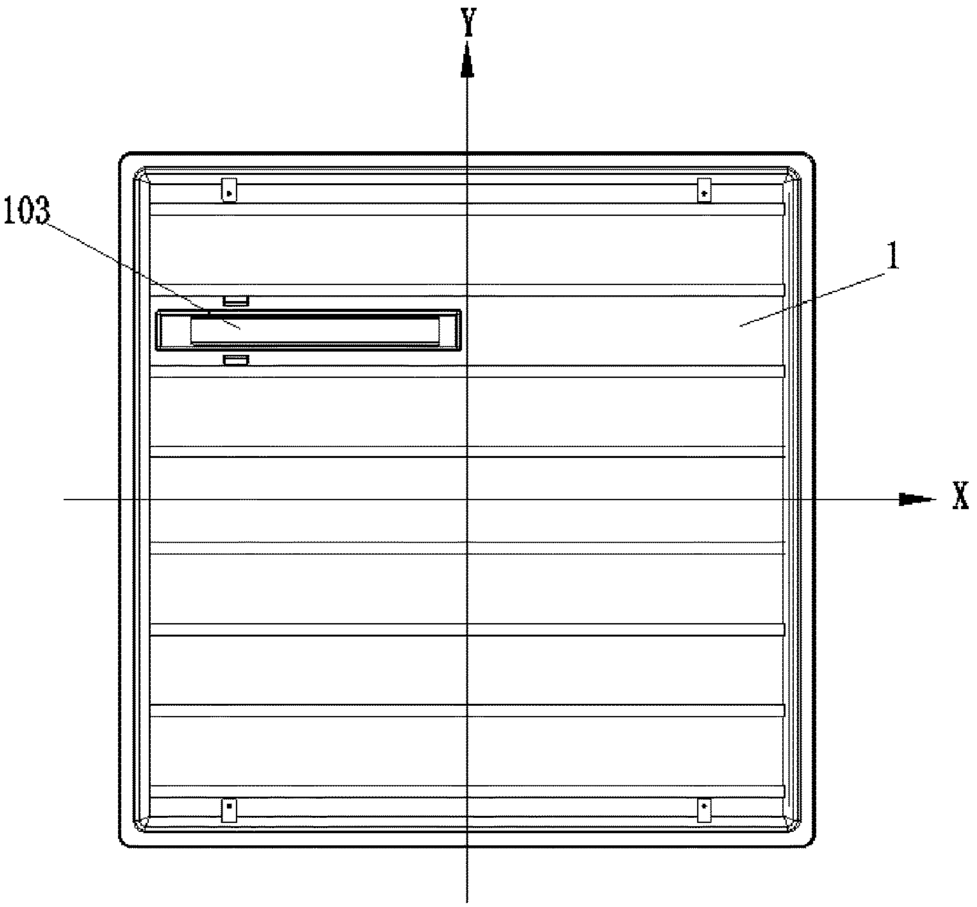

Referring to FIGS. 26 and 27, the protrusion 103 is one in number, according to one embodiment. When two LED lighting devices are stacked in a back-to-back manner, one of the LED lighting devices is rotated with a specific angle (such as 90 degrees, 180 degrees or 270 degrees), the protrusions 103 of the two LED lighting devices are interlaced to make the total height less than 2 times the height of a single LED lighting device. Thus, when two or more LED lighting devices are stacked in the above manner, the package size and the transportation costs can be reduced. In the embodiment, the back of the LED lighting device is created with a coordinate system, When taking the center of the LED lighting device as the origin, the protrusion 103 is completely located in one quadrant as shown in FIG. 27 or is completely located in two quadrants as shown in FIG. 26.

Figure 28:
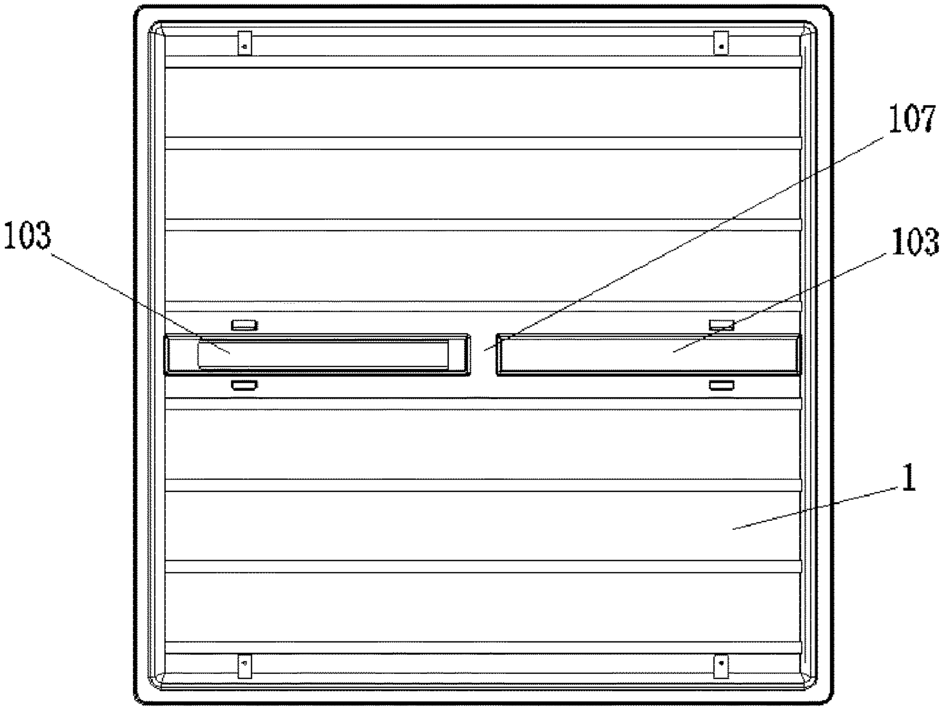

In FIG. 28, the protrusion 103 is two in number, and a gap 107 is formed between the two protrusions 103, according to one embodiment of the present invention. The two protrusions 103 may be arranged along the same direction such as a length direction or a width direction of the LED lighting device. When two LED lighting devices are stacked in a back-to-back manner, one LED lighting device is rotated 90 degrees, and the protrusions 103 of the two LED lighting devices are interlaced, the total height is less than 2 times the height of a single LED lighting device. The gap 107 can prevent two protrusions 103 from interfering with each other when two LED lighting devices are connected in a back-to-back manner. In the embodiment, the gap 107 is located at the center of the seat 1, and its size in an extending direction of the protrusion 103 is greater than a width of the protrusion 103.

Figure 25:
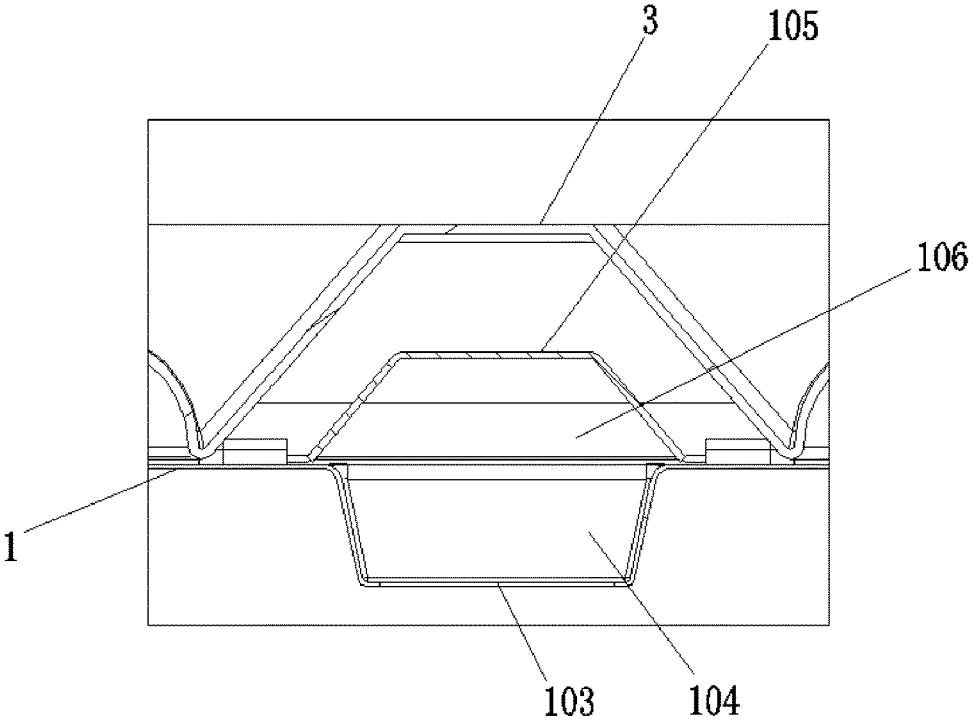
FIG. 25 is an enlarged view of part H in FIG. 22.
Figure 29:
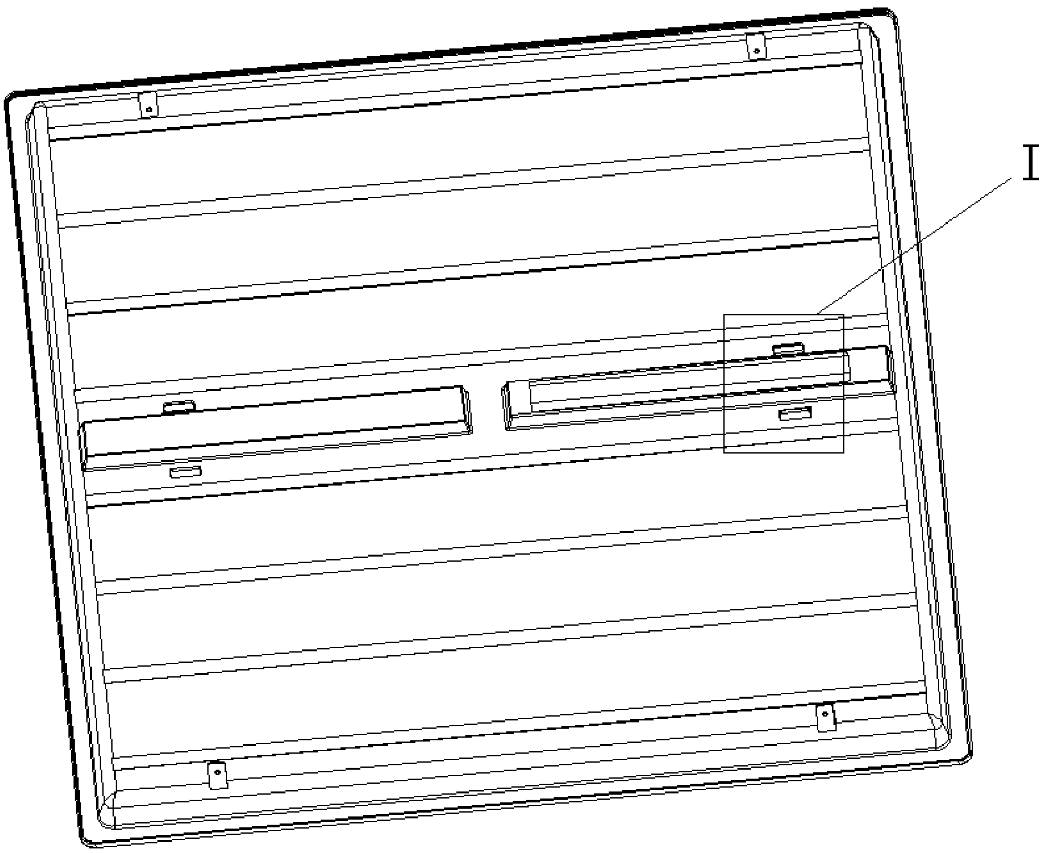
FIG. 29 is a perspective schematic view of an embodiment of the LED lighting device.
Figure 30:
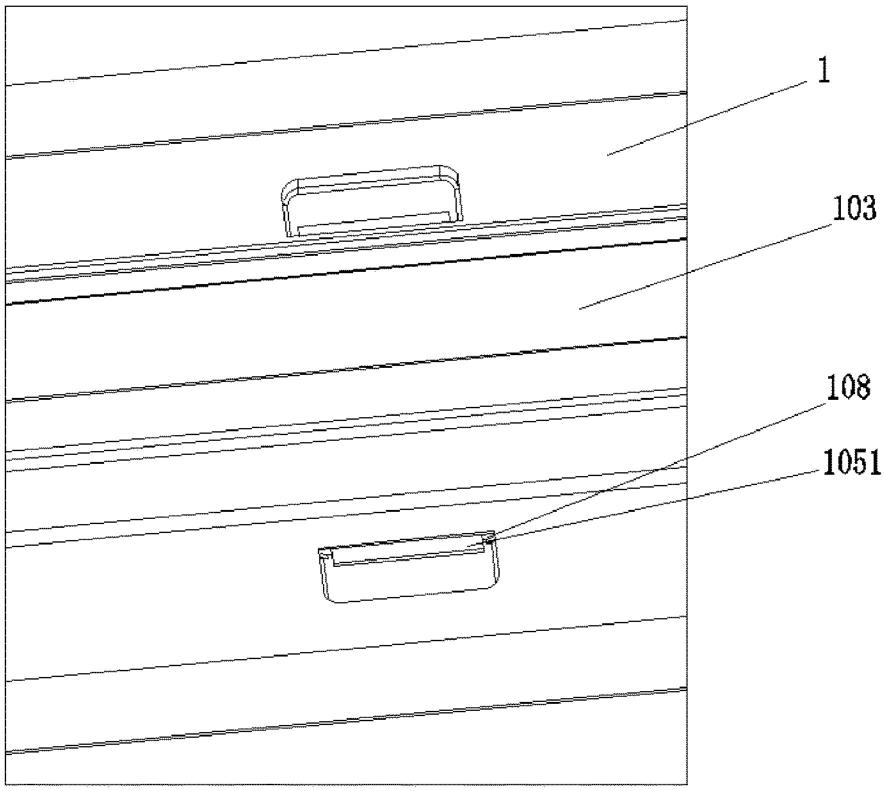
FIG. 30 is an enlarged view of part I in FIG. 29.

In FIGS. 25, 29, and 30, the protrusion 103 is located at a middle position of the LED lighting device (seat 1) in a length direction or a width direction to make the LED lighting device be of a substantially symmetrical structure, according to one embodiment of the invention. In the embodiment, a cap 105 separately associates with two recesses 104. The cap 105 is disposed with an inserting wall 1051. The seat 1 is correspondingly disposed with an inserting hole 108. When the inserting wall 1051 of the cap 105 is inserted into the inserting hole 108 of the seat 1, the cap 105 can be fixed to the seat 1.

A distance between the LED chip 21 and the cap 105 is configured to be greater than 15 mm in some embodiments. In addition, an angle a between a sidewall of the cap 105 and a surface of the seat 1 is configured to be greater than 120 degrees in some embodiments. Thus, the effect of the blocking of the cap 105 on the light emitting of the LED chip 21 can be prevented or reduced.

In FIG. 14, the LED lighting device further includes a bracket 5, according to some embodiments. The bracket 5 is used to install the device LED lighting device onto a support of a ceiling. The bracket 5 may be made of a metal such as copper or iron. An end of the bracket 5 is fixed to the end wall 13, and the other end thereof is bent to be hung on the support.

Please refer to FIGS. 14 and 17 to 20. A beam angle of the LED chip 21 of the LED array 23 is A. As for the definition of the beam angle (the luminous intensity is equal to 50% of the peak light intensity of the direction of the inclusive angle is defined as the beam angle) is well-known, details will not be described here. In some embodiments, the beam angle A may be between about 100 degrees and about 130 degrees. The LED chip 21 is projected onto an inner surface of the first optical member 311 with the boundary of the beam angle A as the range, and a projection area in is formed on the inner surface of the first optical member 311 (the projection area in is a curved surface, a plane or other irregular surface), an area of the projection area in is greater than 500 $mm^2$. To avoid the formation of graininess on the first optical member 311 when the LED chips 21 are lit., without considering the influence of the adjacent LED chips 21, the light intensity on the projection area in should be less than 50,000 lux.

The size of the projection area in depends on the distance from the LED chip 21 to the first optical member 311. The longer the distance, the greater the thickness of the optical unit 3 (the total thickness will increase). This is disadvantageous to cost control. When the distance is small, the area of the projection area in is less than 500 $mm^2$. This makes the illuminance not easy to be controlled and forms a grainy sense. Thus, in the embodiment, the distance from the LED chip 21 to the first optical member 311 is controlled to be between 6 mm and 15 mm. Also, without considering the influence of the adjacent LED chips 21, the light intensity on the projection area in should be greater than 10000 lux. When the projection area in is non-planar, the shortest distance from the center of the surface of the LED chip 21 to the first optical member 311 within the range of the beam angle A can be used as the distance to be controlled.

The luminous flux of the LED chip 21 is L. When the LED chips 21 in the LED array 23 are arranged in only one row, the projection areas in of the LED chips 21 of the same LED array 23 on the inner surface of the first optical member 311 may partially overlap. Considering the overlapping of the projection areas in of different LED chips 21 on the inner surface of the first optical member 311, the illuminance of any position in any projection area in does not exceed 5 L/m, to prevent the overlapping of the projection areas in of the LED chips 21 from forming strong light. In one embodiment, the illuminance of any position in any projection area in does not exceed 4 L/m, so as to prevent the formation of strong light when the projection areas in of the LED chips 21 are superimposed. In one embodiment, the illuminance of any position in any projection area in does not exceed 3 L/m, so as to prevent the formation of strong light when the projection areas in of the LED chips 21 are superimposed. In one embodiment, the illuminance of any position in any projection area in does not exceed 2 L/m, so as to prevent the formation of strong light when the projection areas in of the LED chips 21 are superimposed.

One of the factors affecting the overlapping of the projection areas in of the LED chips 21 is the distance between the LED chips 21. In one embodiment, the center-to-center distance between the LED chips 21 is controlled to be greater than 4 mm or more than 4.5 mm.

In one embodiment, the number of LED chips 21 in the LED array 23 is n, and the number of projection areas in superimposed by any area of any projection area in is less than or equal to n. In one embodiment, the number of LED chips 21 in the LED array 23 is n, and the number of projection areas in superimposed by any area of any projection area in is less than n.

Figure 20:
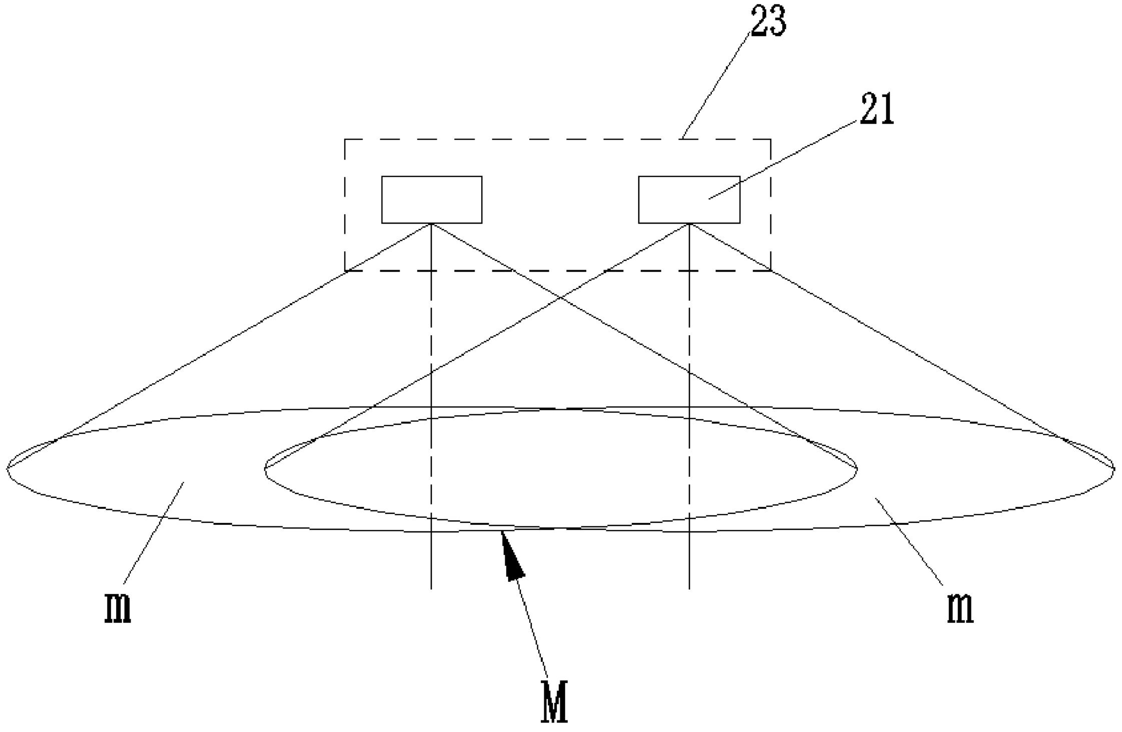
FIG. 20 is a schematic view of light emitting of the LED array.

The total area of the projection area on the inner surface of the first optical member 311 is M. FIG. 20 as an example, when the LED array 23 has two LED chips 21, the projection areas in of the two LED chips 21 overlap, the area of the total projection area M on the inner surface of the first optical member 311 is composed of the boundary of the projection areas in of the two LED chips 21 on the inner surface of the first optical member 311. That is, the area of the total projection area M is the sum of the areas of the projection areas in of the two LED chips 21 on the inner surface of the first optical member 311 subtracts the area of the overlapping area.

The luminous intensity near an optical axis of the beam angle A is greater than the luminous intensity of the marginal area of the beam angle A. That is, in a single projection area in, the luminous intensity within its range is not even. Therefore, it can be arranged as follows. More than 30%, 35%, or 40% of the total projection area M on the inner surface of the first optical member 311 has the overlapping of at least two projection areas in, so as to improve the uniformity of illumination in the total projection area M. However, in order to avoid the overlapping of too many projection areas in to cause uneven luminous intensity, not more than 25%, 20% or 18% of the area of the total projection area M on the inner surface of the first optical member 311 can be configured to have the overlapping of four or more projected areas in.

Based on the above, in the embodiment, when one optical unit 31 is provided (without a lens), the uniformity of light emitting can be achieved, the structure is simplified, and the material cost is reduced.

Figure 21:
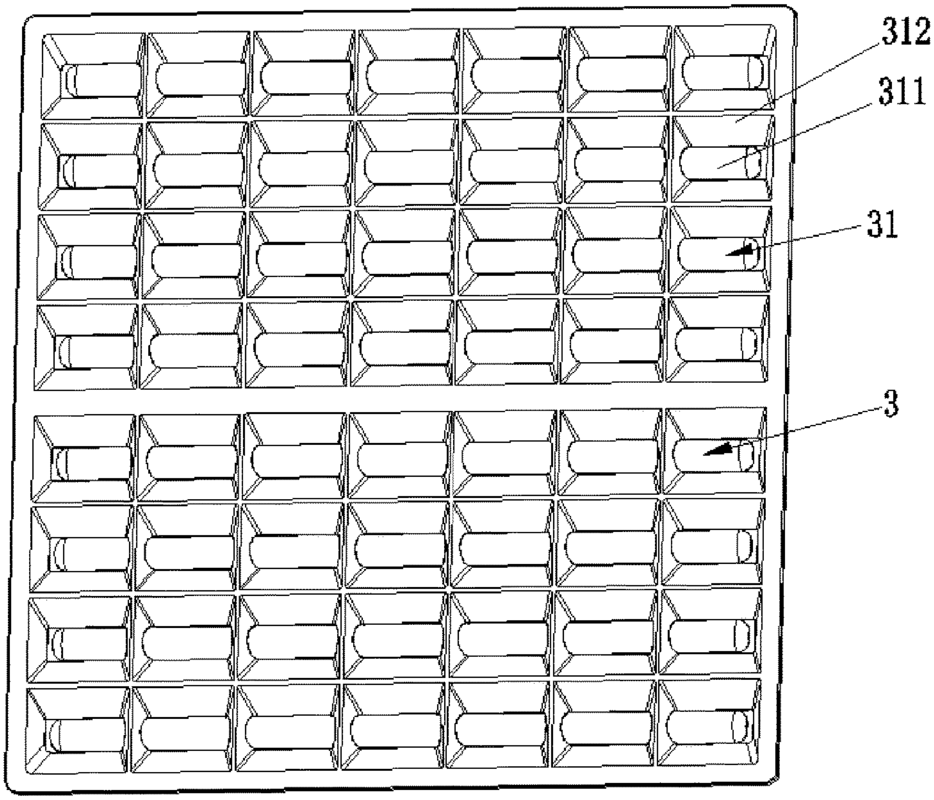
FIG. 21 is a structural schematic view of an embodiment of the LED lighting device.
Figure 22:
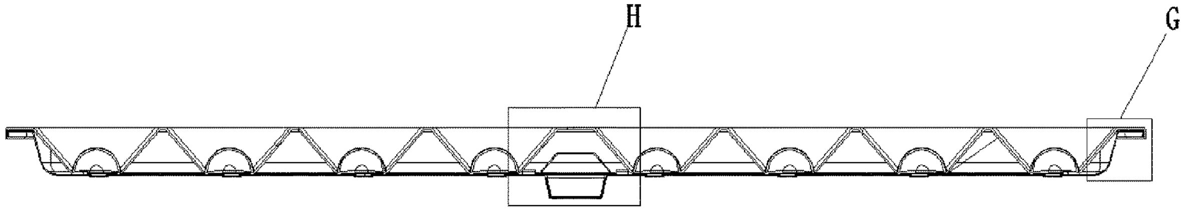
FIG. 22 is a cross-sectional schematic view of an embodiment of the optical assembly of the LED lighting device.
Figure 23:
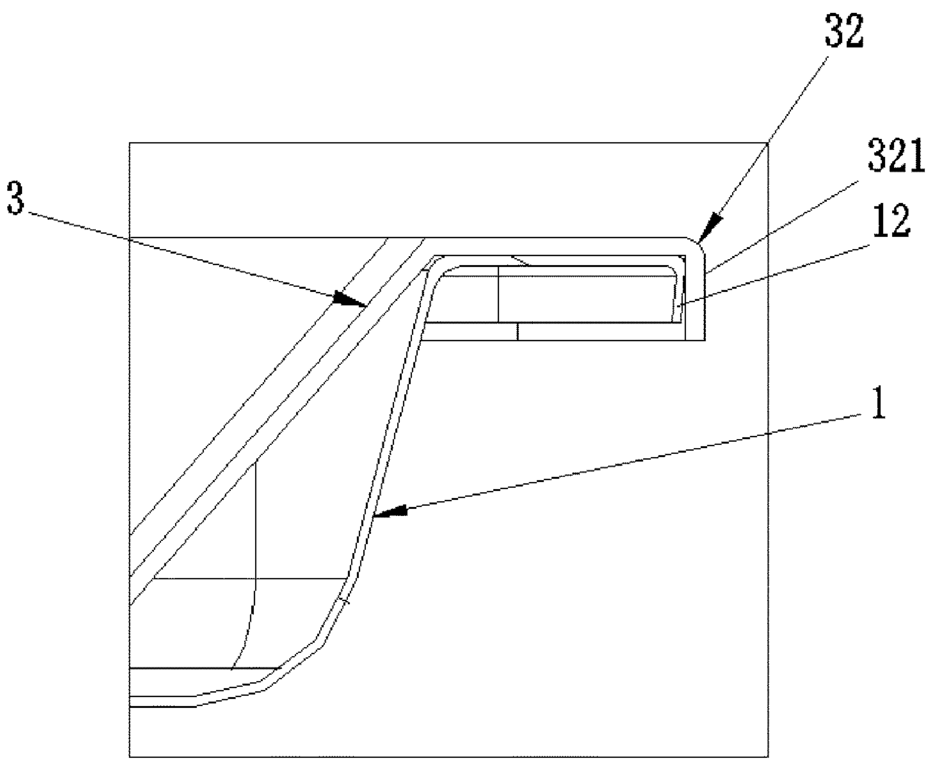
FIG. 23 is an enlarged view of part G in FIG. 22.
Figure 24:
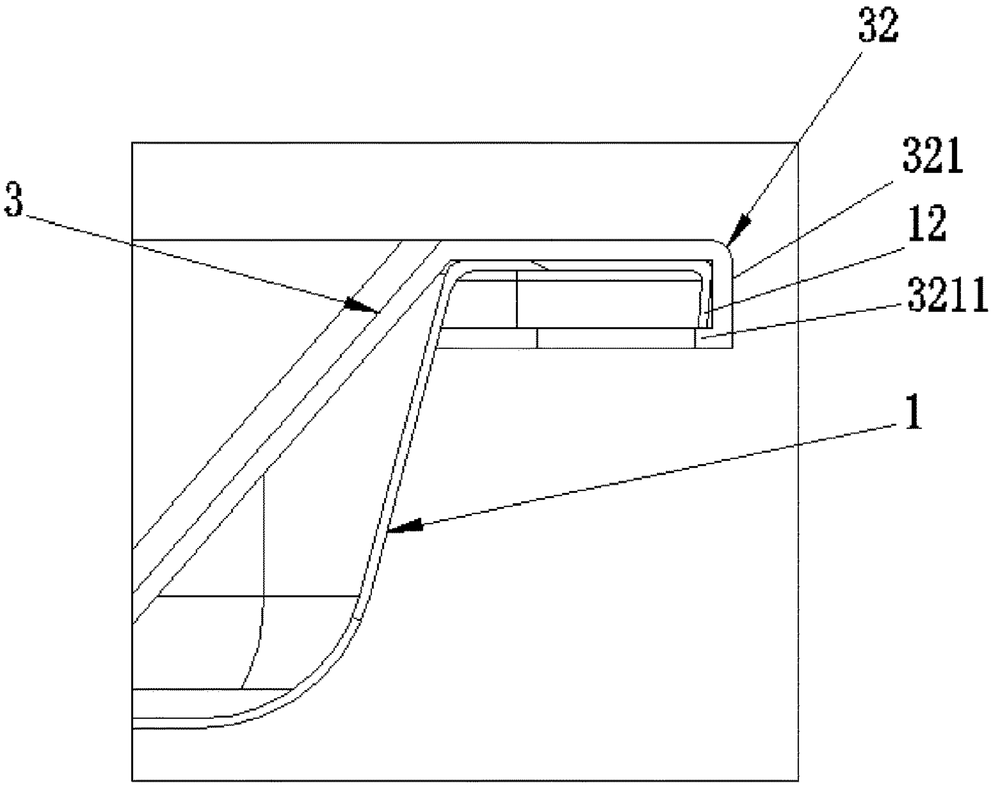
FIG. 24 is a partial cross-sectional view of the installing unit.
Figure 31:
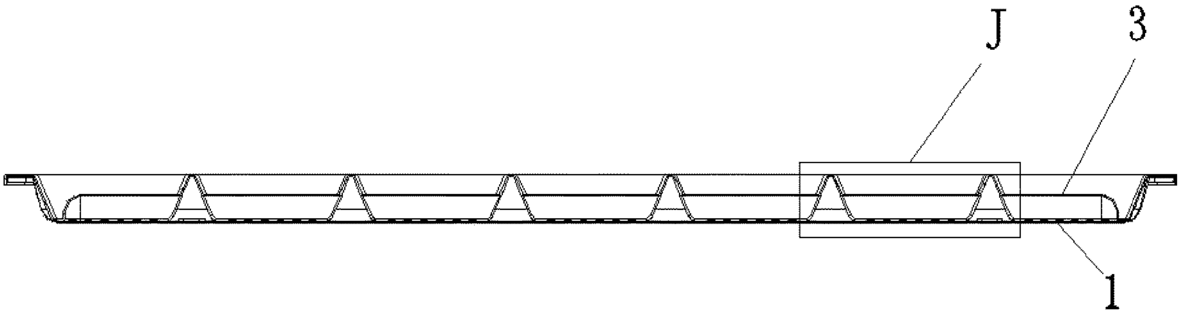
FIG. 31 is a cross-sectional schematic view of an embodiment of the LED lighting device.
Figure 32:
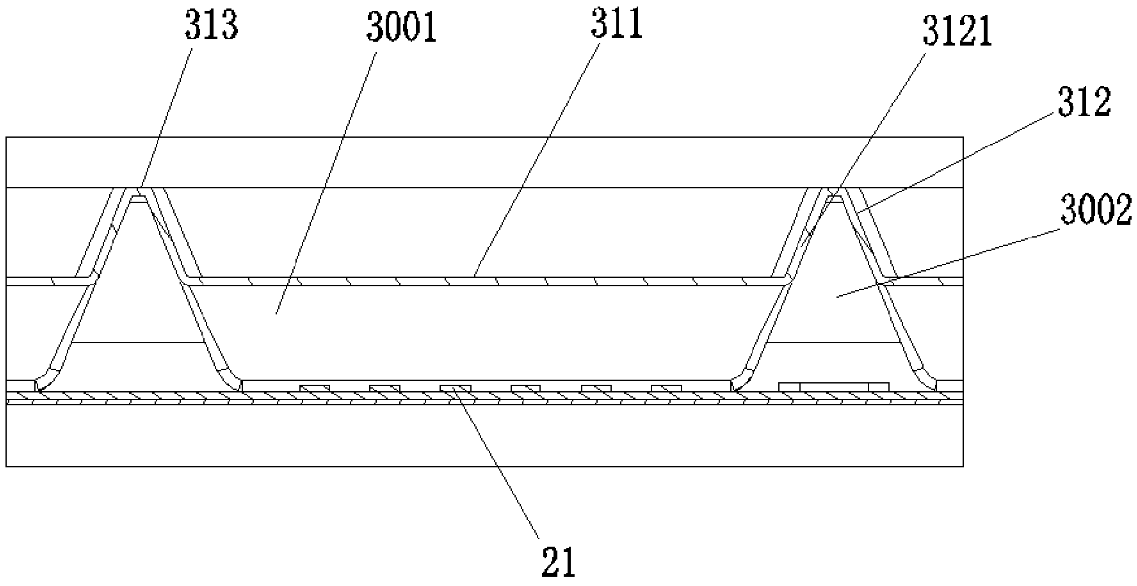
FIG. 32 is an enlarged view of part J in FIG. 31.
Figure 33:
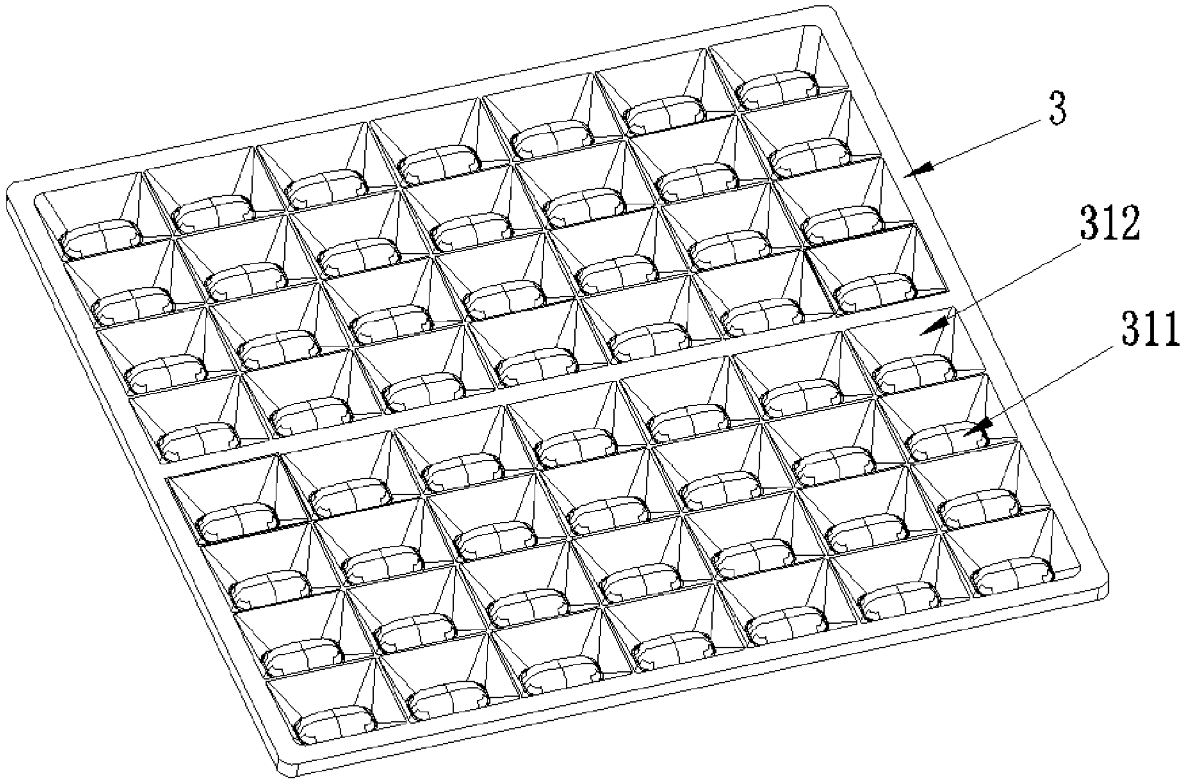
FIG. 33 is a perspective schematic view of an embodiment of the LED lighting device.
Figure 34:
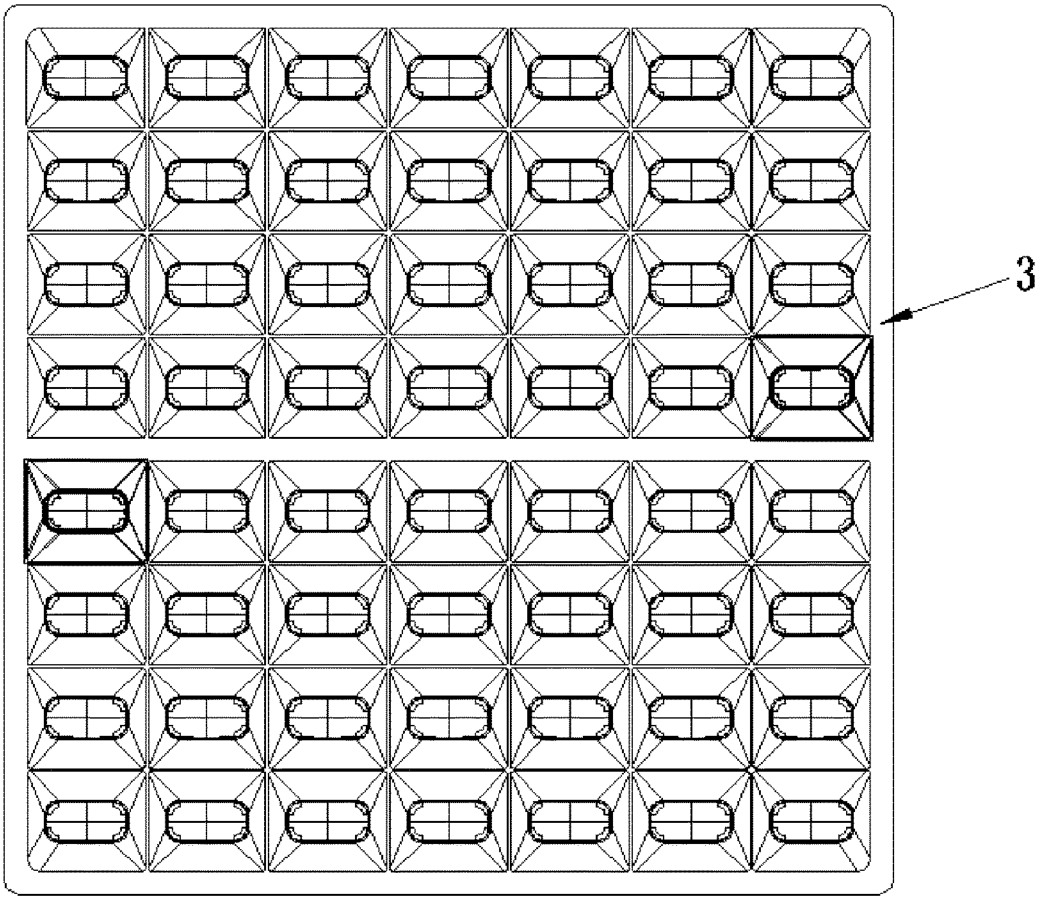
FIG. 34 is a front schematic view of an embodiment of the LED lighting device.
Figure 35:
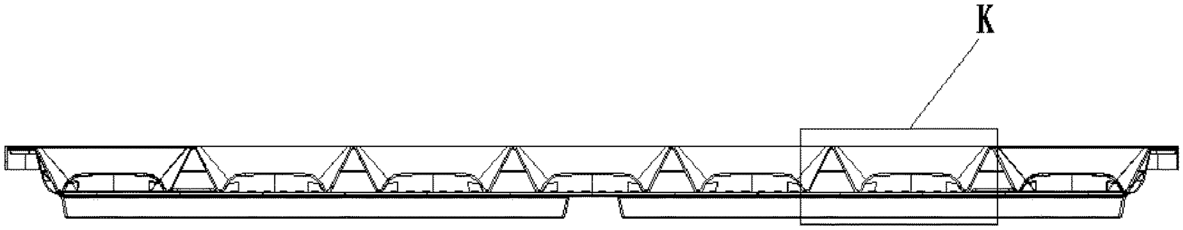
FIG. 35 is a cross-sectional schematic view of an embodiment of the LED lighting device.

As shown in FIGS. 21, 31 and 32, in one embodiment, a first cavity 3001 is formed in the first optical member 311 (between the first optical member 311 and a surface of the seat 1), and a second cavity 3002 is formed between adjacent second optical members 312. The first optical member 311 is connected to the optical wall 3121 of the second optical member 312 in the length direction thereof, and the first cavity 3001 communicates with the second cavity 3002. When the LED chip 21 emits light, at least part of the light enters the second cavity 3002 after being reflected by the seat 1 and the first optical member 311, and penetrates through the corresponding optical wall 3121 and/or the first connecting wall 313 to improve the light emitting effect of the optical assembly 3.

Figure 36:
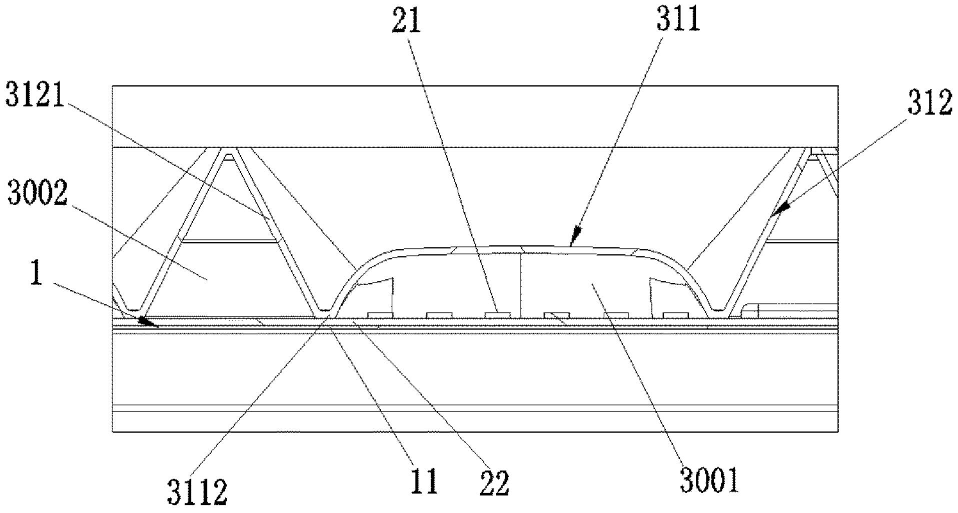
FIG. 36 is an enlarged view of part K in FIG. 35.
Figure 37:
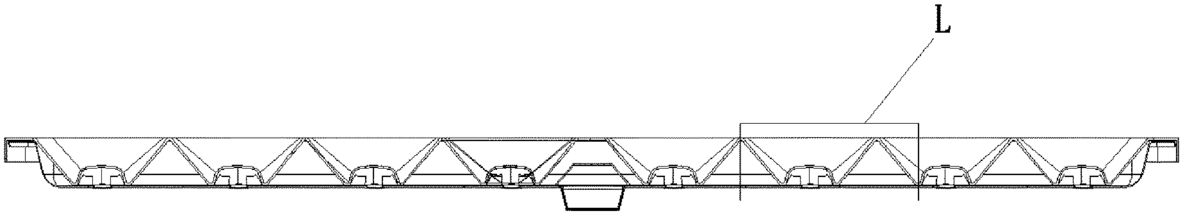
FIG. 37 is a cross-sectional schematic view of an embodiment of the LED lighting device, which shows a different cross-section from FIG. 35.
Figure 38:
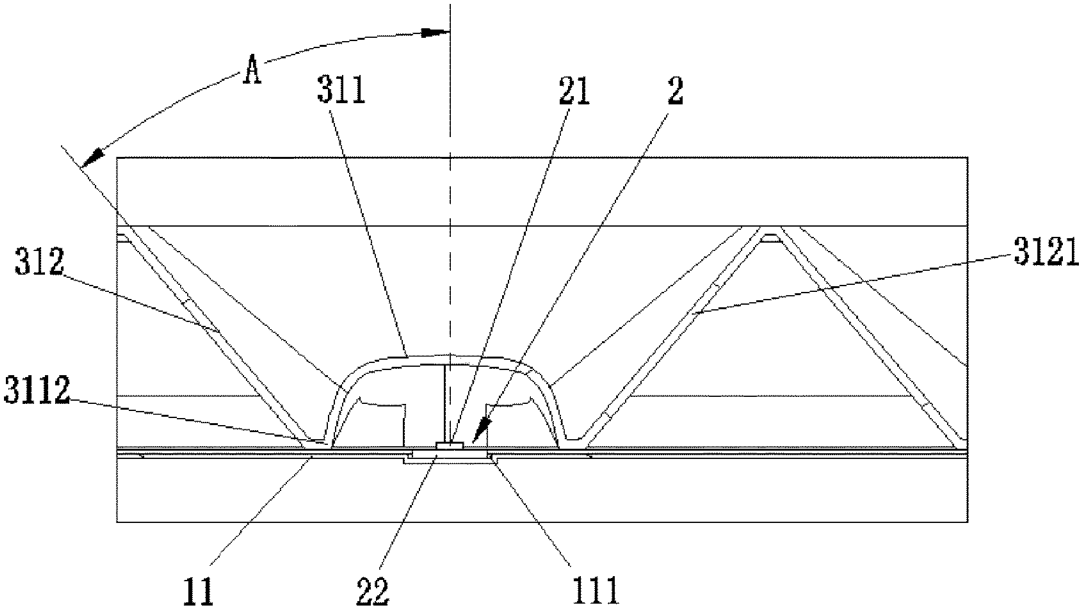
FIG. 38 is an enlarged view of part L in FIG. 37.

As shown in FIGS. 33 to 38, a first cavity 3001 is formed in the first optical member 311 (between the first optical member 311 and the surface of the seat 1), and a second cavity 3002 is formed between adjacent second optical members 312, according to some embodiments. The first optical member 311 is not connected (not directly connected) with the optical wall 3121 of the second optical member 312 in its length direction and width direction. Therefore, the first cavity 3001 does not communicate with the second cavity 3002 (excluding the connection caused by assembling gaps, it can be regarded as the first cavity 3001 not communicating with the second cavity 3002 when the assembly gap here is less than 5 mm) This can reduce the light from the light source 2, which is reflected in the first cavity 3001 to enter the second cavity 3002, to cause the light emitted through the first optical member 311 to be more concentrated when the light source 2 works. As shown in FIGS. 36 and 38, in other words, the distance between an end of the first optical member 311 (in terms of FIGS. 36 and 38, the lower portion of the first optical member 311) and the baseplate 11 of the seat 1 is not more than 5 mm, 4 mm, 3 mm, 2 mm or 1 mm to reduce the leakage of the light emitted by the light source 2 via the gaps between the first optical member 311 and the baseplate 11. In one embodiment, an end of the first optical element 312 (in terms of FIGS. 36 and 38, the lower portion of the first optical member 311) is at least partially attached on the baseplate 11 of the seat 1 to further reduce light leakage.

In one embodiment, the baseplate 11 is disposed with a positioning through 111. The light source 2 is at least partially accommodated in the positioning trough 111 in the height direction thereof. In other words, the circuit board 22 of the light source 2 is at least partially accommodated in the positioning trough 111 in the thickness direction. When the surface of the circuit board 22 does not project from the positioning trough 111 (that is, the circuit board 22 is completely accommodated in the positioning trough 111 in the thickness direction), the end 3112 of the first optical member 311 (in terms of FIGS. 36 and 38, the lower portion of the first optical member 311) can be directly attached on the baseplate 11. When a part of the circuit board 22 is accommodated in the positioning trough 111 in the thickness direction, the end 3112 of the first optical member 311 (in terms of FIGS. 36 and 38, the lower portion of the first optical member 311) abuts against a surface of the circuit board 22. At this time, the end 3112 of the first optical member 311 (in terms of FIGS. 36 and 38, the lower portion of the first optical member 311) and the baseplate 11 are kept at a distance, and the distance can be the height of an exposed portion of the circuit board 22 projecting from the positioning through 111.

In one embodiment, the optical wall 3121 has a function of reflection, which can reflect part of the light emitted from the first optical member 311 to reduce light emitting of the LED lighting device in a lateral direction of the first optical member 311 so as to reduce glare. In this embodiment, on a cross-section of the first optical member 311 in a width direction, the optical wall 3121 and an optical axis of the LED chip 21 form an acute angle A. The acute angle A formed between the optical wall 3121 and the optical axis of the LED chip 21 is between about 30 degrees to about 60 degrees. The optical wall 3121 includes a wall portion corresponding to a length direction of the first optical member 311 and another wall portion corresponding to a width direction of the first optical member 311. The angle between each of the wall portion in the length direction of the first optical member 311 and the wall portion in the width direction of the first optical member 311 and the optical axis of the LED chip 21 is within the range of the aforementioned acute angle A. In one embodiment, the included angle between corresponding two sets of optical walls 3121 in the width direction of the first optical member 311 is smaller than the beam angle of the LED chip 21 to block light and reduce glare. In addition, the included angle between corresponding two sets of optical walls 3121 in the width direction of the first optical member 311 (i.e., the double of the acute angle A) is greater than degrees to prevent excessively restricting the light emitting angle of the LED lighting device.

Figure 39:
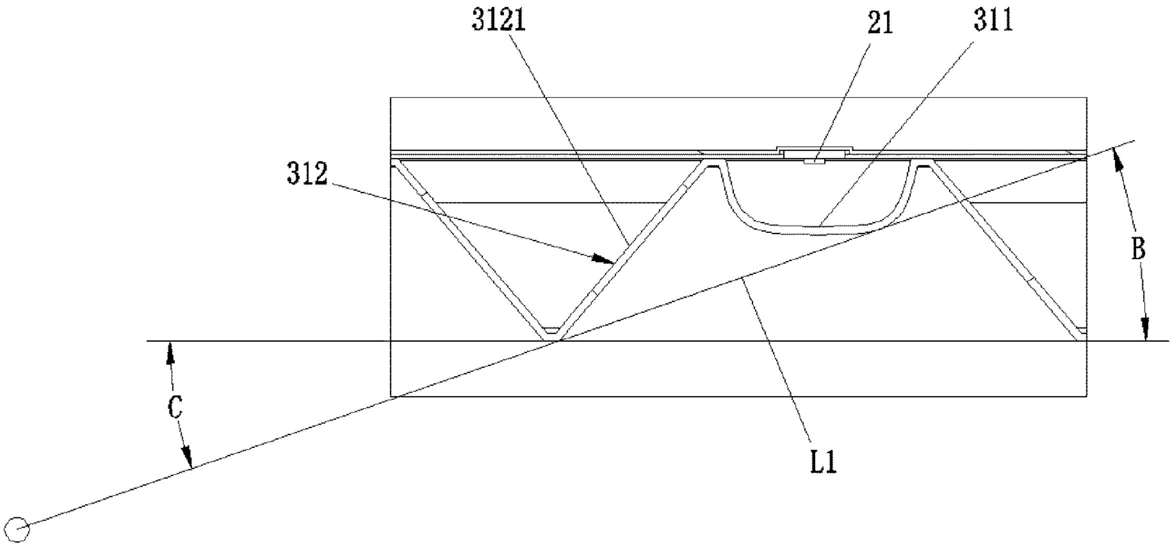
FIGS. 39-42 are partial cross-sectional schematic views of some embodiments of the LED lighting device, which is horizontally installed and downward emits light.

FIG. 39 shows a partial cross-sectional schematic view of an LED lighting device mounted horizontally and emitting light downward in one embodiment. In this embodiment, on the cross-section of the first optical member 311 in the width direction, the optical wall 3121 of the second optical member 312 has a lower end point, and the lower end point extends along a direction and forms a straight line. The straight line L1 is tangent to an outer surface of the first optical member 311. The included angle B between the straight line L1 and the horizontal plane (that is, the light-emitting surface of the LED lighting device, when the LED lighting device is installed along the level, the light-emitting surface is parallel or approximately parallel to the horizontal plane) is greater than 10 degrees, 12 degrees, 14 degrees, 16 degrees or 18 degrees. In one embodiment, the included angle B between the straight line L1 and the horizontal plane (that is, the light-emitting surface of the LED lighting device, when the LED lighting device is installed along the level, the light-emitting surface is parallel or substantially parallel to the horizontal plane) is between 15 degrees and 25 degrees. In one embodiment, the included angle B between the straight line L1 and the horizontal plane (that is, the light-emitting surface of the LED lighting device, when the LED lighting device is installed along the level, the light-emitting surface is parallel or substantially parallel to the horizontal plane) is between 18 degrees and 20 degrees. When a human eye and the first optical member 311 (or the LED lighting device) are in a certain position (when the angle C between a straight line through the human eye and the light-emitting surface of the LED lighting device is less than the aforementioned included angle B), the human eye will not directly observe direct light emitting from the first optical member 311, so glare can be reduced. From another point of view, a straight line L1 is set, one end of the straight line L1 is connected to the lower end point of the optical wall 3121, and the other end of the straight line L1 is tangent to the outer surface of the first optical member 311, and the included angle between the straight line L1 and the horizontal plane (that is, the light-emitting surface of the LED lighting device, when the LED lighting device is installed along the level, the included angle B between the light-emitting surface is parallel or approximately parallel to the horizontal plane) is greater than 10 degrees, 12 degrees, 14 degrees, 16 degrees or 18 degrees. In some embodiments, the included angle B between the straight line L1 and the horizontal plane is between 15 degrees and 25 degrees. In some embodiments, the included angle B between the straight line L1 and the horizontal plane is between 18 degrees and 20 degrees. The shape of the cross-section of the optical wall 3121 in this embodiment may not be set to be straight and flat. Glare can be reduced as long as the position of the lower end point thereof meets the above requirements.

Figure 40:
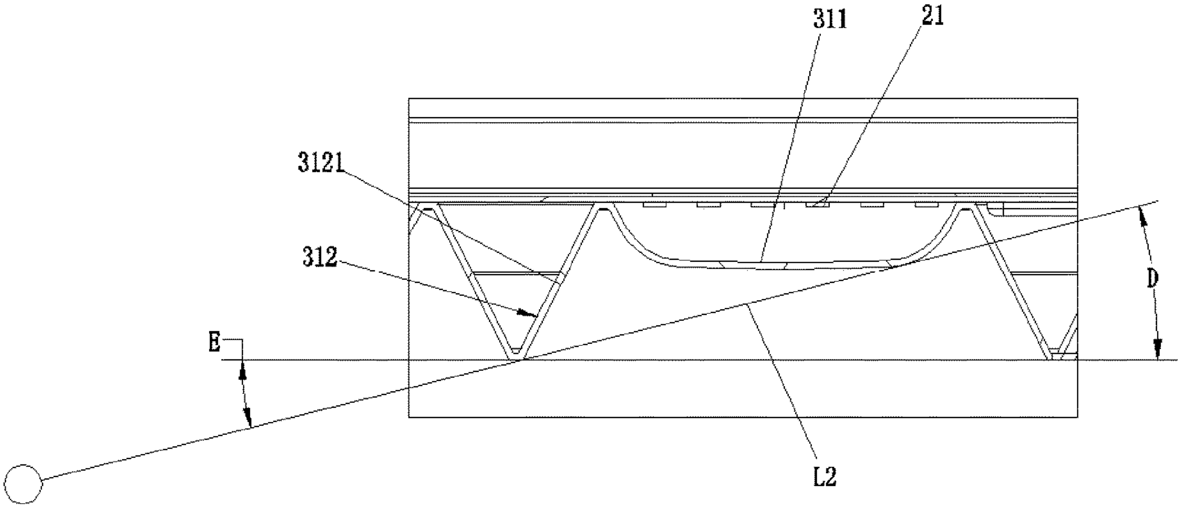

FIG. 40 shows a partially cross-sectional schematic view of the LED lighting device mounted horizontally and emitting light downward in one embodiment. In this embodiment, on the cross-section of the first optical member 311 in the length direction, the optical wall 3121 of the second optical member 312 has a lower end point, and the lower end point extends along one direction and forms a straight line. The straight line L2 is tangent to the outer surface of the first optical member 311. The included angle D between the straight line L2 and the horizontal plane (that is, the light-emitting surface of the LED lighting device, when the LED lighting device is installed along the level, the light-emitting surface is parallel or approximately parallel to the horizontal plane) is smaller than the included angle B. In some embodiments, the included angle D is greater than 10 degrees, 11 degrees, 12 degrees or 13 degrees. In one embodiment, the included angle D is between about 10 degrees and about 20 degrees. In some embodiments, the included angle D is between 12 degrees and 16 degrees. When the human eye and the first optical member 311 (or the LED lighting device) are in a certain position (when the angle E between a straight line through the human eye and the first optical member 311 and the light-emitting surface of the LED lighting device is less than the aforementioned included angle D), the human eye will not directly observe direct light emitted from the first optical member 311, so glare can be reduced. From another point of view, a straight line L2 is set, one end of the straight line L2 is connected to the lower end point of the optical wall 3121, and the other end of the straight line L2 is tangent to the outer surface of the first optical member 311, and the included angle D between the straight line L2 and the horizontal plane (that is, the light-emitting surface of the LED lighting device, when the LED lighting device is installed along the level, the light-emitting surface is parallel or approximately parallel to the horizontal plane) is between about 10 degrees and about 20 degrees. In some embodiments, the included angle D is between 12 degrees and 16 degrees. The shape of the cross-section of the optical wall 3121 in this embodiment may not be set to be straight and flat. Glare can be reduced as long as the position of the lower end point thereof meets the above requirements.

Figure 41:
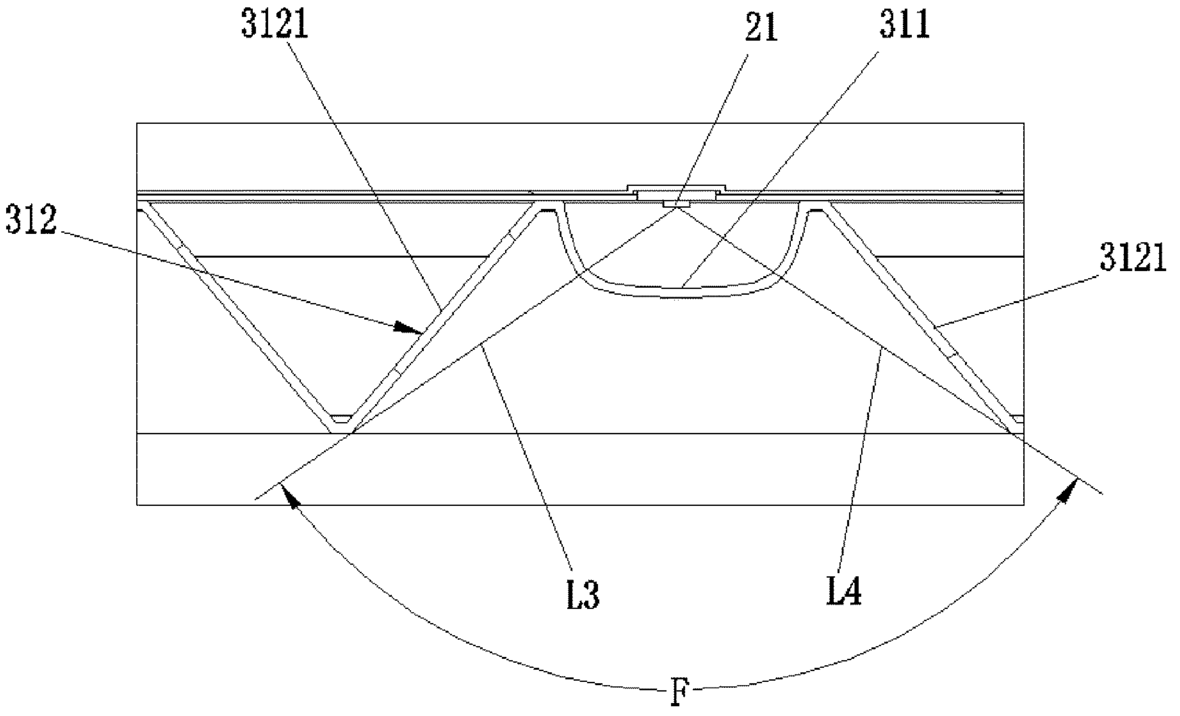

FIG. 41 shows a partial cross-sectional schematic view of the LED lighting device mounted horizontally and emitting light downward in one embodiment. In this embodiment, on the cross section of the first optical member 311 in the width direction, each of the two sets of optical walls 3121 of the second optical member 312 corresponding to the LED chip 21 has a lower end point. The included angle F between each of two straight lines through the center of the light-emitting surface of the LED chip 21 and anyone of the lower end points of the two sets of optical walls 3121 is greater than 0.8 times the beam angle A of the LED chip 21 (at a place where the light intensity of the LED chip 21 reaches 50% of the luminous intensity of the normal, the angle formed by the two sides is the beam angle A), so as to prevent the optical walls 3121 from excessively blocking light emitted from the LED chip 21 causing light loss and reducing the light emitting efficiency. In some embodiments, the included angle F is less than 1.2 times the beam angle A of the LED chip 21 (at a place where the light intensity of the LED chip 21 reaches 50% of the luminous intensity of the normal, the included angle formed by the two sides is the beam angle A, where the beam angle A is about 120 degrees) to ensure that the optical walls 3121 have a certain light blocking effect to reduce glare.

Figure 42:
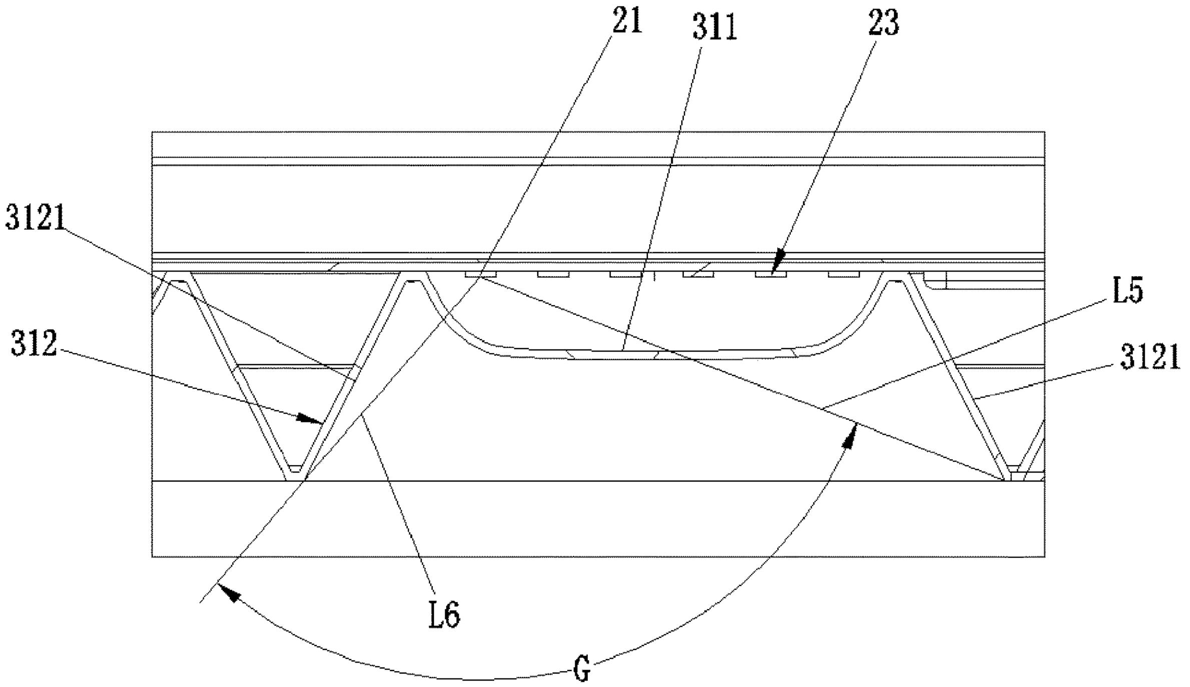

FIG. 42 shows a partial cross-sectional schematic view of the LED lighting device mounted horizontally and emitting light downward in one embodiment. In this embodiment, on the cross-section of the first optical member 311 in the length direction, there is an LED array 23 corresponding to the first optical member 311, and the two sets of optical walls 3121 of the second optical member 312 are correspondingly disposed to the LED array 23 in the first optical member 311. Each set of optical walls 3121 has a lower end point. The included angle G between lines L5 and L6 through a midpoint of the light-emitting surface of any LED chip 21 in the LED array 23 corresponding to the first optical member 311 and the lower end points of the two sets of optical walls 3121 is greater than 0.8 times the beam angle A of the LED chip 21 (at a place where the light intensity of the LED chip 21 reaches 50% of the luminous intensity of the normal, the included angle formed by the two sides is the beam angle A, where the beam angle A is about 120 degrees), so as to prevent the optical walls 3121 from excessively blocking the light emitted from the LED chip 21 causing light loss and reducing the light emitting efficiency. In some embodiments, the included angle G is less than 1.2 times the beam angle A of the LED chip 21 (at a place where the light intensity of the LED chip 21 reaches 50% of the luminous intensity of the normal, the included angle formed by the two sides is the beam angle A) to ensure that the optical walls 3121 have a certain light blocking function to reduce glare.

In one embodiment, there is only one thermal resistance layer (i.e., the optical assembly 3) on the optical axis direction (light-emitting direction) of the LED chip 21. When the LED chip 21 works, at least part of the heat generated by the LED chip 21 is radiated to the thermal resistance layer, and is outwardly dissipated through the thermal resistance layer. In comparison with the LED chip 21 which needs to use multiple thermal resistance layers (the conventional is disposed with at least two of a lampshade, a lens, a diffuser plate or a light guide plate to achieve the effect of uniform light emitting, but each of the above components constitutes a thermal resistance layer) to outwardly dissipate heat in the optical axial direction, the heat dissipation efficiency of the invention is improved.

In one embodiment, there is only one layer of light-permeable material (i.e., the optical assembly 3) on the optical axis direction (light-emitting direction) of the LED chip 21. When the LED chip 21 works, the light generated by the LED chip 21 is emitted to the light-permeable material and passes through the light-permeable material to be emitted from the LED lighting device. In comparison with the LED chip 21 which needs to use multiple light-permeable materials (the conventional is disposed with at least two of a lampshade, a lens, a diffuser plate or a light guide plate to achieve the effect of uniform light emitting, but each of the above components cause certain light loss) to outwardly emit light in the optical axial direction, the light-emitting efficiency of the invention is improved. In some embodiments, the light-emitting efficiency of the LED lighting device is greater than 80%, 85% or 90%. The light-emitting efficiency refers to the ratio of the luminous flux emitted from the LED lighting device to the total luminous flux generated by the LED chip 21.

In one embodiment, the light-permeable part (the first optical member 311) and the anti-glare part (the second optical member 312) adopt substantially the same laminated material and are an integrated element.

The technical contents of this disclosure will become apparent with the detailed description of embodiments accompanied with the illustration of related drawings as abovementioned. It is intended that the embodiments and drawings disclosed herein are to be considered illustrative rather than restrictive. While this disclosure has been described by means of specific embodiments, numerous modifications and variations could be made thereto by those skilled in the art without departing from the scope and spirit of this disclosure set forth in the claims.

What is claimed is:

1. A light-emitting diode (LED) lighting device comprising:

a seat comprising a baseplate, a sidewall and an end wall, the sidewall comprising a first end and a second end, the first end of the sidewall connecting to a periphery of the baseplate and forming a chamber with the baseplate, the second end of the sidewall connecting to the end wall and forming a receiving space with the end wall, wherein the chamber is separated from the receiving space by the sidewall, and the end wall and the baseplate are substantially parallel to each other;

a light source disposed in the chamber and attached to a surface of the baseplate, the light source comprising a plurality of LED arrays and each of the LED arrays comprising at least one LED chip;

an electric power source disposed in the receiving space and electrically connecting to the light source; and an optical assembly disposed on the light source, the optical assembly comprising a plurality of first optical members and a plurality of second optical members corresponding to the first optical members, each one of the first optical members covering one of the LED arrays, each of the second optical members comprising a set of optical walls and each set of optical walls surrounding one of the first optical members, wherein the optical wall and an optical axis of the LED chip form an acute angle.

2. The LED lighting device of claim 1, wherein each one of the LED arrays is arranged to correspond to one of the first optical members and a quantity of the LED arrays are the same as the first optical members.

3. The LED lighting device of claim 2, wherein each of the LED arrays is substantially cloaked by one of the first optical members.

4. The LED lighting device of claim 3, wherein each one of the first optical members has a light-emitting surface, whereby a portion of light emitted from the LED arrays penetrates the first optical member and then exits from the light-emitting surface.

5. The LED lighting device of claim 4, wherein the light-emitting surface has a main portion and two end portions separately and substantially located at two ends of the main portion, and further wherein a cross-section of the main portion has an arcuate shape.

6. The LED lighting device of claim 5, wherein the light-emitting surface is a light transmissive and diffusive surface.

7. The LED lighting device of claim 6, wherein the baseplate comprises a positioning unit including a strip-shaped trench formed on the baseplate.

8. The LED lighting device of claim 7, wherein the electric power source is disposed on a back side of the seat and the light source is disposed on a front side of the seat.

9. The LED lighting device of claim 8, wherein the LED lighting device further comprises an electric connecting unit attached to the baseplate and electrically connecting the electric power source to the light source.

10. The LED lighting device of claim 9, wherein the sidewall is formed by bending the periphery of baseplate.

11. The LED lighting device of claim 10, wherein the optical walls are arranged obliquely relative to the baseplate.

12. The LED lighting device of claim 11, wherein four optical walls of the second optical members are connected in series and surrounding the first optical member, and each optical wall is a plane wall.

13. The LED lighting device of claim 12, wherein at least a portion of light emitted from the LED arrays penetrates the optical walls and at least a portion of light emitted from the LED arrays is reflected by the optical walls.

14. The LED lighting device of claim 13, wherein the optical assembly further comprises a first connecting wall, the optical walls of two adjacent second optical members are connected through the first connecting wall, whereby at least a portion of light penetrating the optical walls exits from the first connecting wall to prevent the first connecting wall from forming a dark area.

15. The LED lighting device of claim 13, wherein the first optical member and the second optical member are composed of substantially the same laminate material and are an integrated element, wherein the material has reflective and light-permeability functions.

16. The LED lighting device of claim 13, wherein the light-emitting surface is more adjacent to the LED array than the second optical member.

17. The LED lighting device of claim 13, wherein the light source comprises a plurality of circuit boards, a plurality of LED arrays are disposed on the plurality of the circuit boards, and each LED array comprises at least one LED chip.

18. The LED lighting device of claim 17, wherein the electric connecting unit is attached to the baseplate and electrically connects the plurality of the circuit boards to the electric power source.

19. The LED lighting device of claim 18, wherein the optical wall and an optical axis of the LED chip form an acute angle A, and the acute angle A is between about 30 degrees to about 60 degrees.

20. The LED lighting device of claim 19, wherein an angle between the corresponding two sets of optical walls in the width direction of the first optical member is smaller than a beam angle of the LED chip.

* * * * *